United States Patent
Suryavanshi

(10) Patent No.: US 10,187,311 B2
(45) Date of Patent: Jan. 22, 2019

(54) SELECTIVELY TRANSFERRING HIGH-PRIORITY NON-AUDIO DATA OVER A QUALITY OF SERVICE CHANNEL

(71) Applicant: QUALCOMM Incorporated, San Diego, CA (US)

(72) Inventor: Vijay A. Suryavanshi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/236,026

(22) Filed: Aug. 12, 2016

(65) Prior Publication Data

US 2016/0352641 A1    Dec. 1, 2016

Related U.S. Application Data

(62) Division of application No. 13/926,737, filed on Jun. 25, 2013, now Pat. No. 9,444,746.

(51) Int. Cl.
*H04L 12/28* (2006.01)
*H04L 12/853* (2013.01)
(Continued)

(52) U.S. Cl.
CPC ..... *H04L 47/2416* (2013.01); *H04N 21/4341* (2013.01); *H04N 21/440227* (2013.01);
(Continued)

(58) Field of Classification Search
CPC ... H04L 1/0002; H04L 29/06; H04L 47/6215; H04L 41/5022; H04L 12/863; H04L 47/24; H04W 28/02
See application file for complete search history.

(56) References Cited

U.S. PATENT DOCUMENTS 5,694,548 A * 12/1997 Baugher ................. H04L 29/06
                                                                    370/231
7,133,362 B2    11/2006 Chu et al.
(Continued)

FOREIGN PATENT DOCUMENTS

CN    1348130 A    5/2002
CN    1857003 A    11/2006
(Continued)

OTHER PUBLICATIONS

International Search Report and Written Opinion—PCT/US2014/043879—ISA/EPO—dated Nov. 28, 2014.

*Primary Examiner* — Hahn N Nguyen
(74) *Attorney, Agent, or Firm* — Muncy, Geissler, Olds & Lowe, P.C.

(57) ABSTRACT

In an embodiment, a transmitting UE is engaged with a target UE in a communication session supported at least in part via a QoS channel on which audio traffic is primarily carried and a non-QoS channel on which non-audio traffic is carried. The transmitting UE obtains audio data and non-audio data for transmission to the target UE during the communication session, and identifies a subset of higher-priority non-audio data within the obtained non-audio data. The transmitting UE transmits a stream of packets including both the audio data and the subset of higher-priority audio data over the QoS channel instead of the non-QoS channel based on the identification. The target UE receives the stream of packets on the QoS channel, and the target UE identifies and extracts the audio data and the higher-priority non-audio data. After extraction, the target UE plays the audio data and processes the higher-priority non-audio data.

11 Claims, 18 Drawing Sheets

(51) Int. Cl.
    *H04W 28/02*     (2009.01)
    *H04W 72/02*     (2009.01)
    *H04N 21/434*     (2011.01)
    *H04N 21/4402*     (2011.01)
    *H04N 21/63*     (2011.01)
    *H04L 12/66*     (2006.01)

(52) U.S. Cl.
    CPC .......... *H04N 21/631* (2013.01); *H04W 28/02* (2013.01); *H04W 72/02* (2013.01)

(56) References Cited

U.S. PATENT DOCUMENTS

| | | | |
|---|---|---|---|
| 7,657,672 | B2 | 2/2010 | Kampmann et al. |
| 7,782,779 | B2 | 8/2010 | Pozhenko et al. |
| 8,069,465 | B1 | 11/2011 | Bartholomay et al. |
| 8,077,707 | B2 | 12/2011 | Isnardi et al. |
| 8,259,566 | B2 * | 9/2012 | Chen .............. H04L 1/0002 370/230 |
| 8,274,908 | B2 | 9/2012 | Hsin et al. |
| 8,301,007 | B2 | 10/2012 | Ichimura |
| 8,339,438 | B2 | 12/2012 | Sylvain |
| 8,364,024 | B2 | 1/2013 | Bennett et al. |
| 8,542,588 | B2 | 9/2013 | Kuhn |
| 9,065,779 | B2 | 6/2015 | Stanwood et al. |
| 9,444,746 | B2 * | 9/2016 | Suryavanshi ......... H04W 28/02 |
| 2002/0145924 | A1 | 10/2002 | Beckwith |
| 2006/0168133 | A1 | 7/2006 | Park et al. |
| 2006/0187962 | A1 | 8/2006 | Wakid |
| 2007/0053445 | A1 | 3/2007 | Schaar et al. |
| 2007/0058559 | A1 | 3/2007 | Xu |
| 2009/0323524 | A1 * | 12/2009 | Kuhn .................. H04L 41/5022 370/230 |
| 2011/0242978 | A1 * | 10/2011 | Klein ..................... H04L 47/24 370/235 |
| 2014/0376563 | A1 | 12/2014 | Suryavanshi |

FOREIGN PATENT DOCUMENTS

| | | |
|---|---|---|
| EP | 1148687 A1 | 10/2001 |
| EP | 1725036 A1 | 11/2006 |
| EP | 2043372 A1 | 4/2009 |
| JP | 2006166453 A | 6/2006 |
| JP | 2007082205 A | 3/2007 |
| JP | 2008502198 A | 1/2008 |
| JP | 2008067350 A | 3/2008 |
| JP | 2010119098 A | 5/2010 |
| WO | 0182558 A2 | 11/2001 |
| WO | 2005119463 A2 | 12/2005 |

* cited by examiner

*FIG. 10* -CONVENTIONAL ART

SELECTIVELY TRANSFERRING HIGH-PRIORITY NON-AUDIO DATA OVER A QUALITY OF SERVICE CHANNEL

CLAIM OF PRIORITY UNDER 35 U.S.C. § 120

The present application for patent is a divisional of U.S. patent application Ser. No. 13/926,737, entitled "SELECTIVELY TRANSFERRING HIGH-PRIORITY NON-AUDIO DATA OVER A QUALITY OF SERVICE CHANNEL," filed Jun. 25, 2013, pending, assigned to the assignee hereof, and expressly incorporated herein by reference in its entirety.

BACKGROUND OF THE INVENTION

1. Field of the Invention

Embodiments of the invention relate to selectively transferring high-priority non-audio data over a Quality of Service (QoS) channel.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

User application services involving concurrent transmission of voice and some other form of media (real-time or non-real time) are typically implemented by sending voice media as a separate independent stream. This is done for several reasons including providing positive user experience allocating preferential treatment to voice packets (e.g., Quality of Service (QoS), etc.). When voice packets are transmitted concurrently with real-time media such as video (e.g., in a video conference for example), the video stream is typically allocated a best effort (BE) without QoS. Thus, depending upon network conditions, the video packets may suffer packet loss, jitter, and/or delay. This results in an inconsistent user experience.

SUMMARY

In an embodiment, a transmitting user equipment (UE) is engaged with a target UE in a communication session supported at least in part via a Quality of Service (QoS) channel on which audio traffic is primarily carried and a non-QoS channel on which non-audio traffic is carried. The transmitting UE obtains audio data and non-audio data for transmission to the target UE during the communication session, and identifies a subset of higher-priority non-audio data within the obtained non-audio data. The transmitting UE transmits a stream of packets including both the audio data and the subset of higher-priority audio data over the QoS channel instead of the non-QoS channel based on the identification. The target UE receives the stream of packets on the QoS channel, and the target UE identifies and extracts the audio data and the higher-priority non-audio data. After extraction, the target UE plays the audio data and processes the higher-priority non-audio data.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
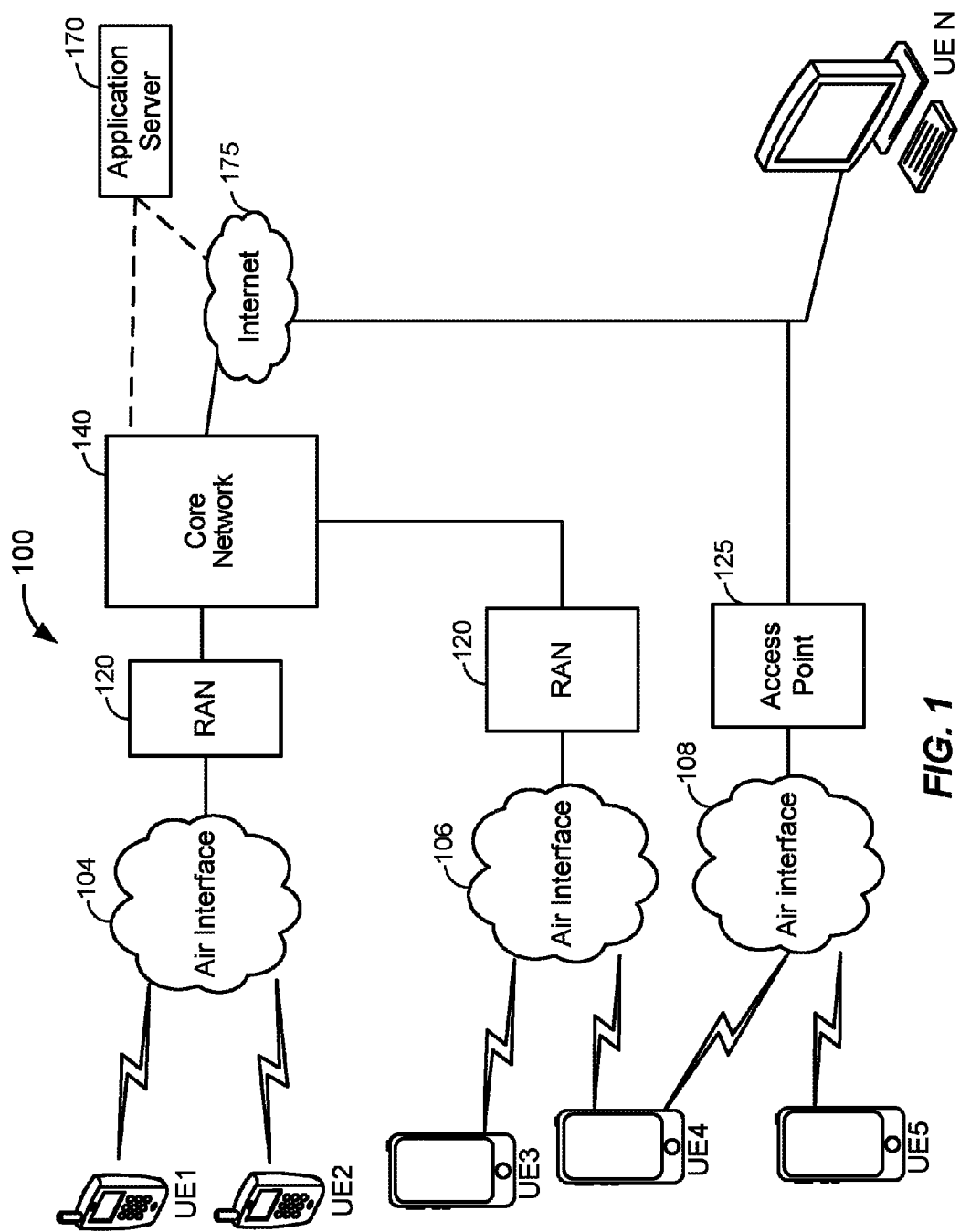
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
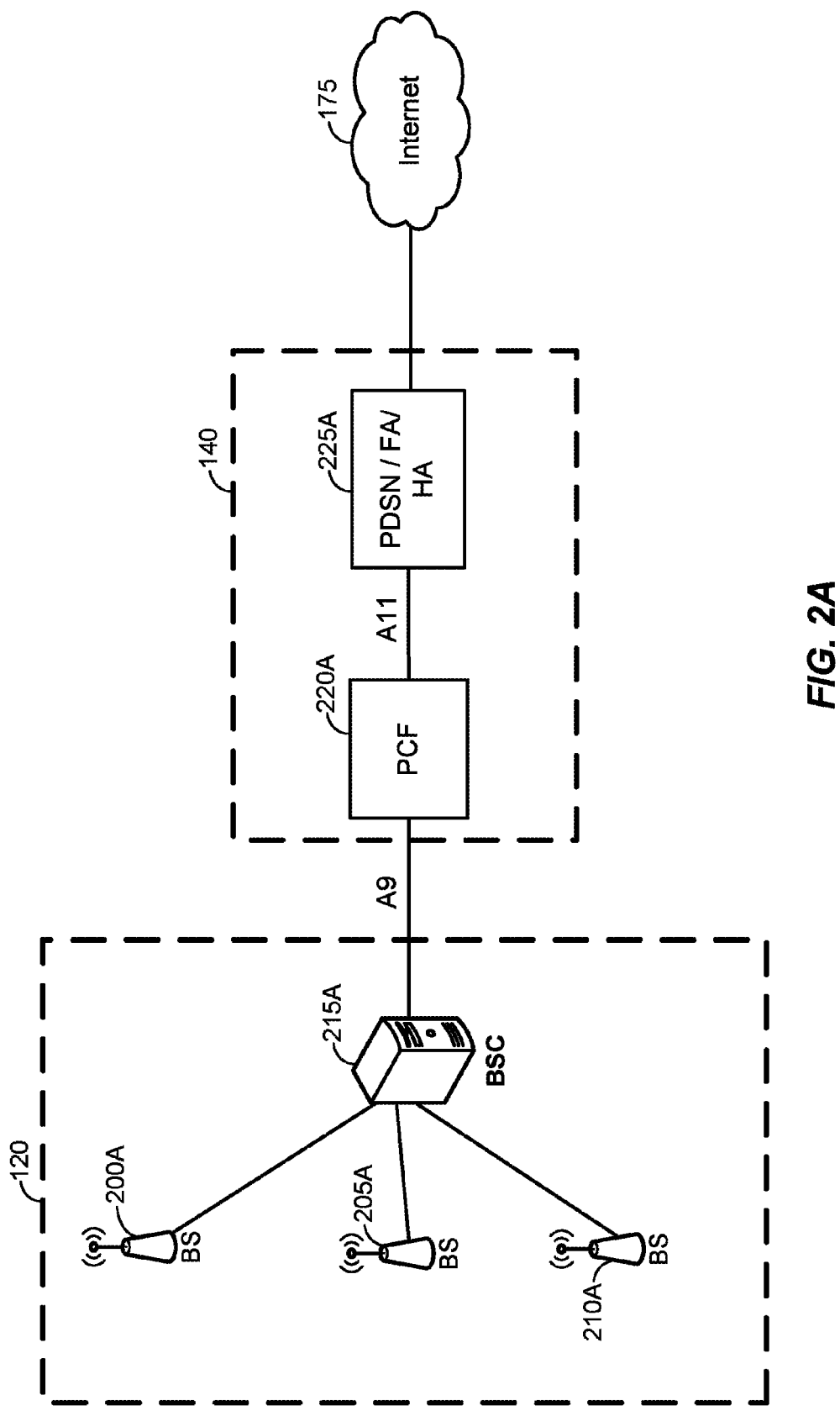
FIG. 2A illustrates an example configuration of a radio access network (RAN) and a packet-switched portion of a core network for a 1×EV-DO network in accordance with an embodiment of the invention.

FIG. 2A illustrates an example configuration of the RAN 120 and the core network 140 for packet-switched communications in a CDMA2000 1× Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
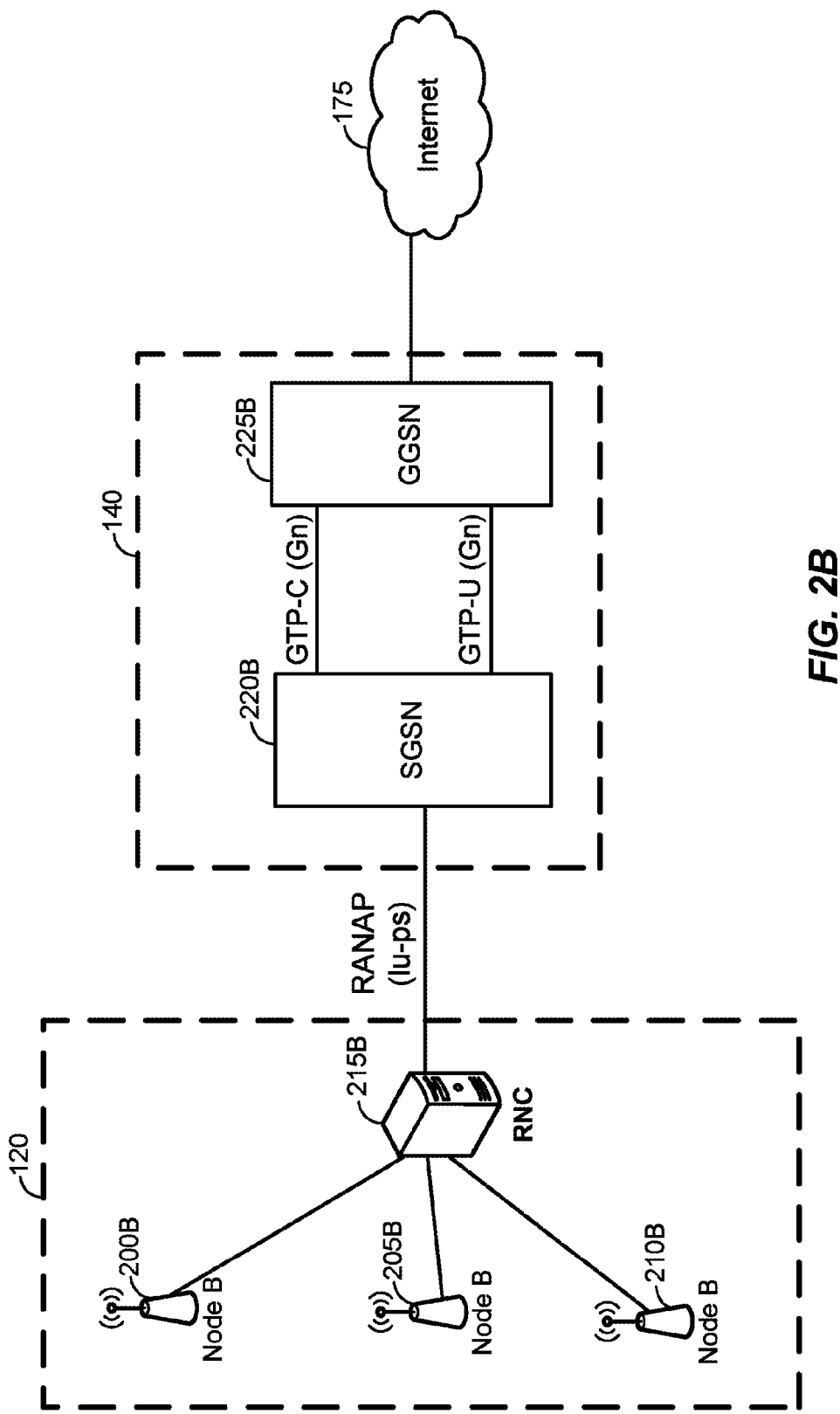
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1×EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
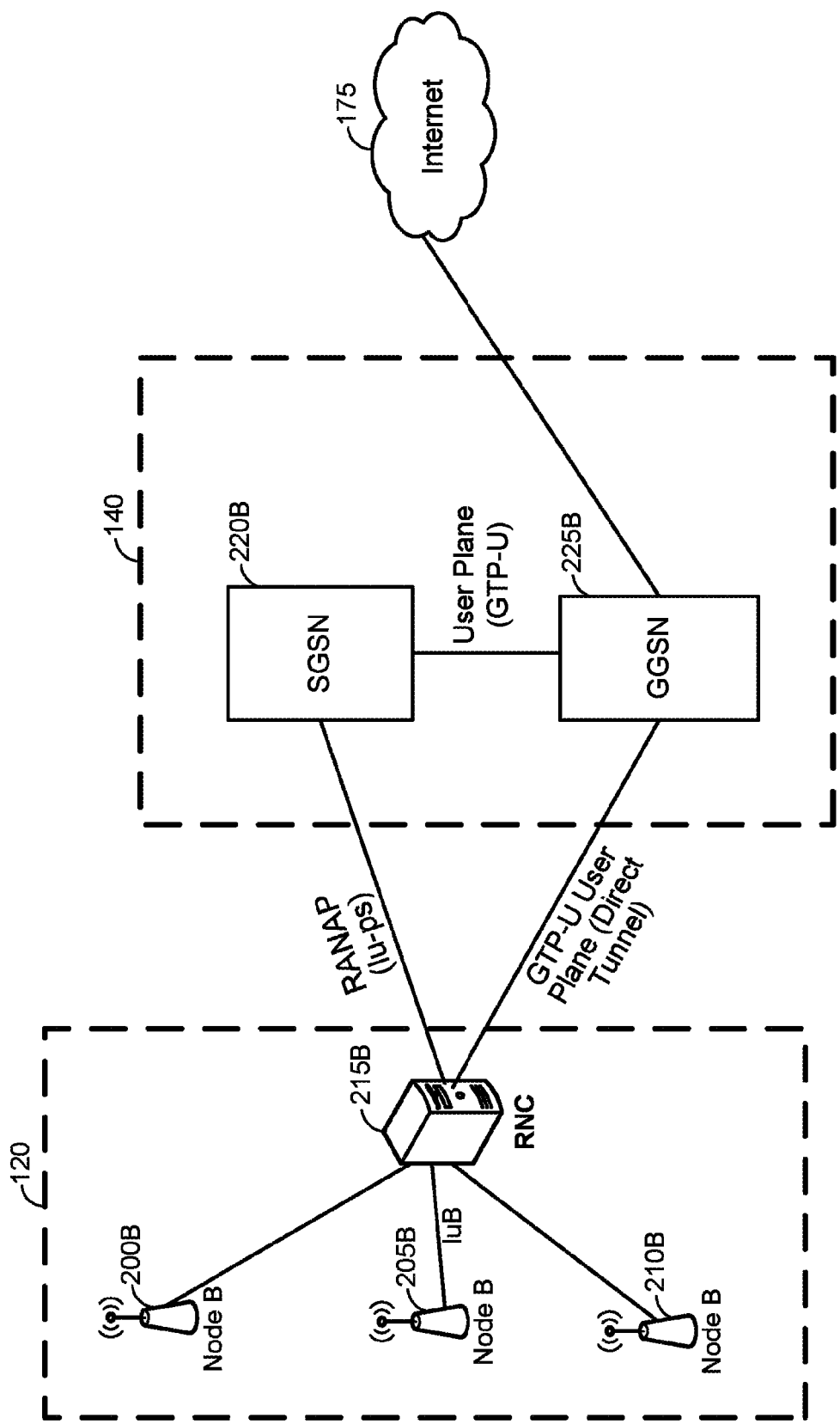
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
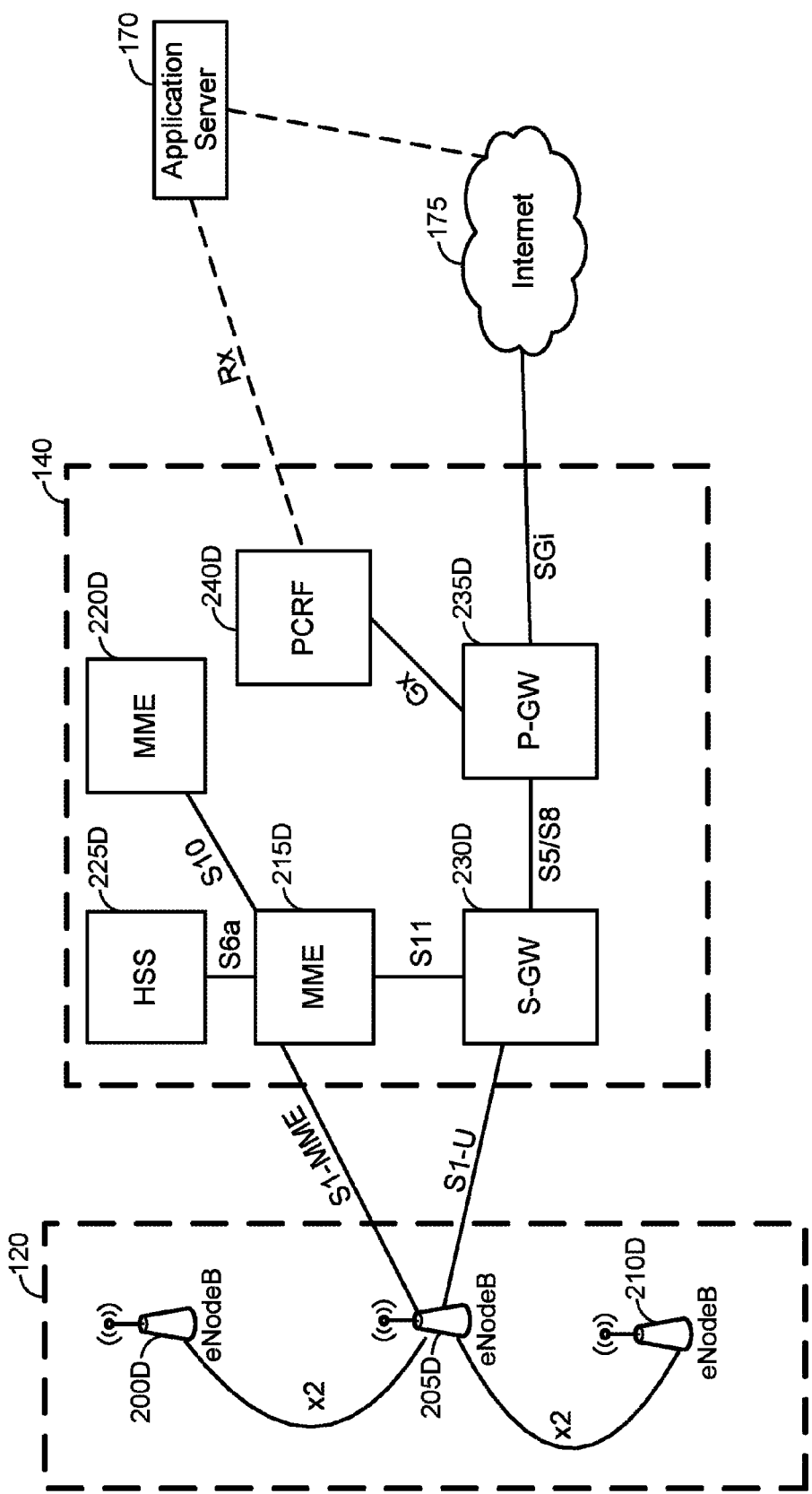
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network ConnectionDefinitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
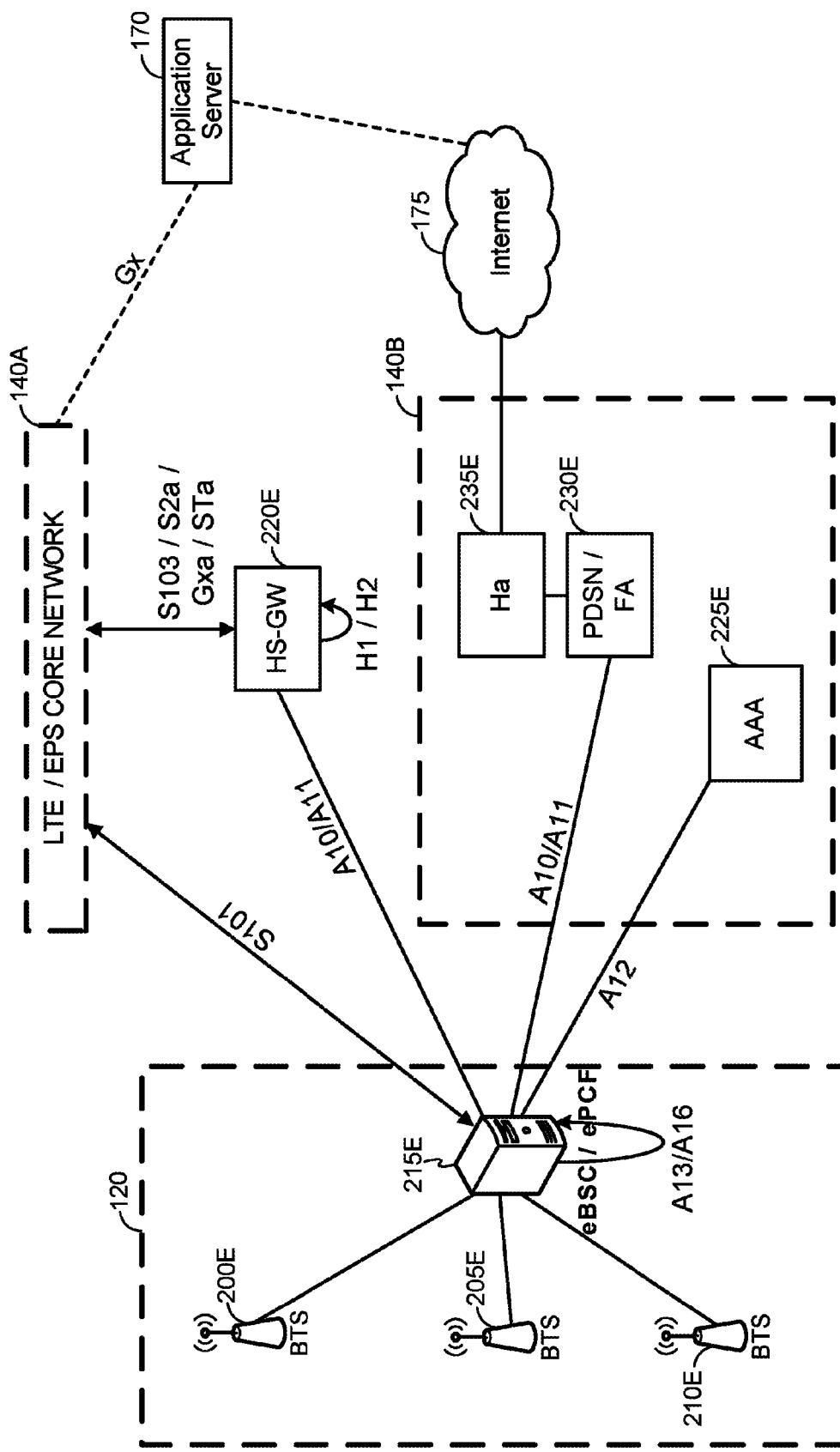
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an 5101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
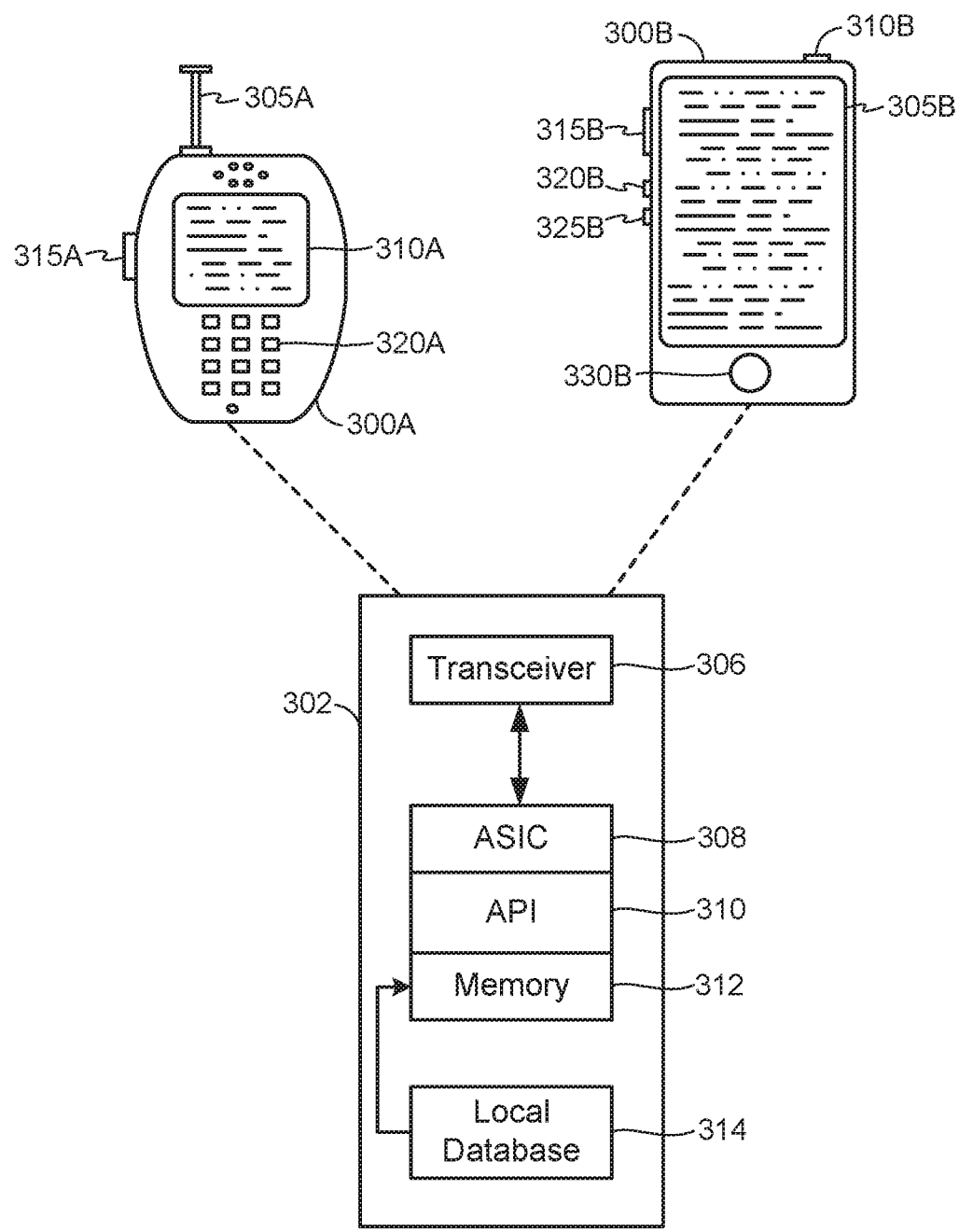
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
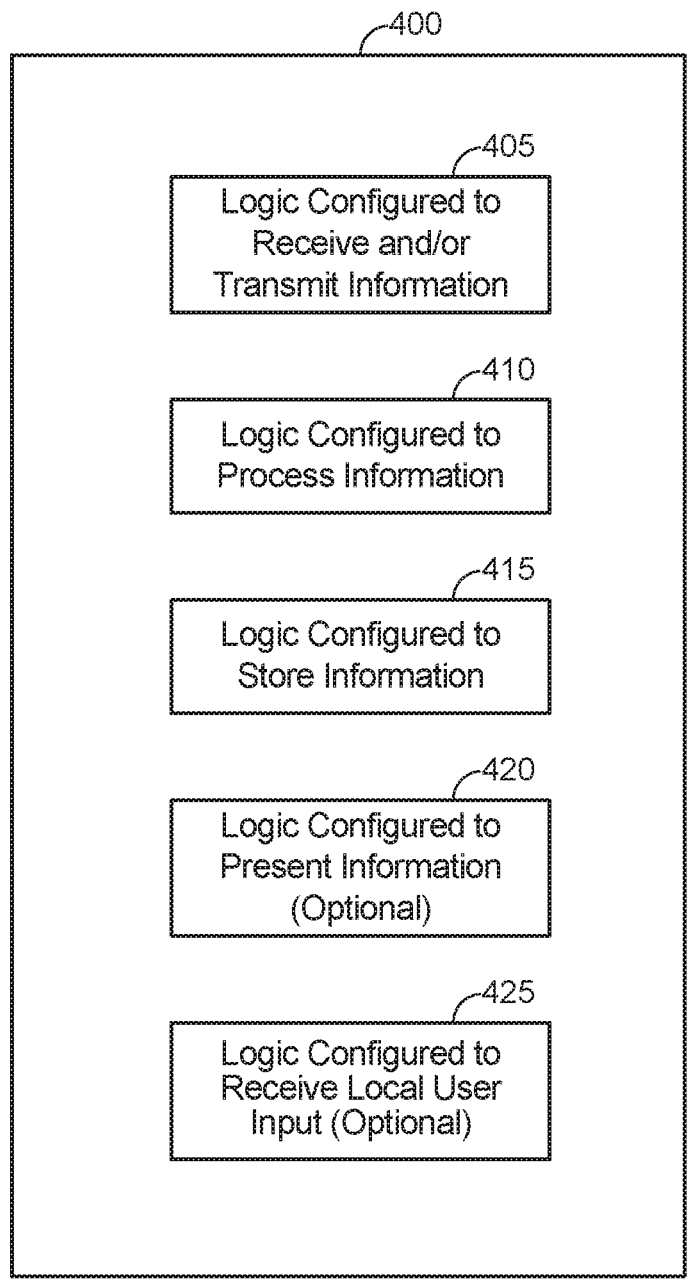
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
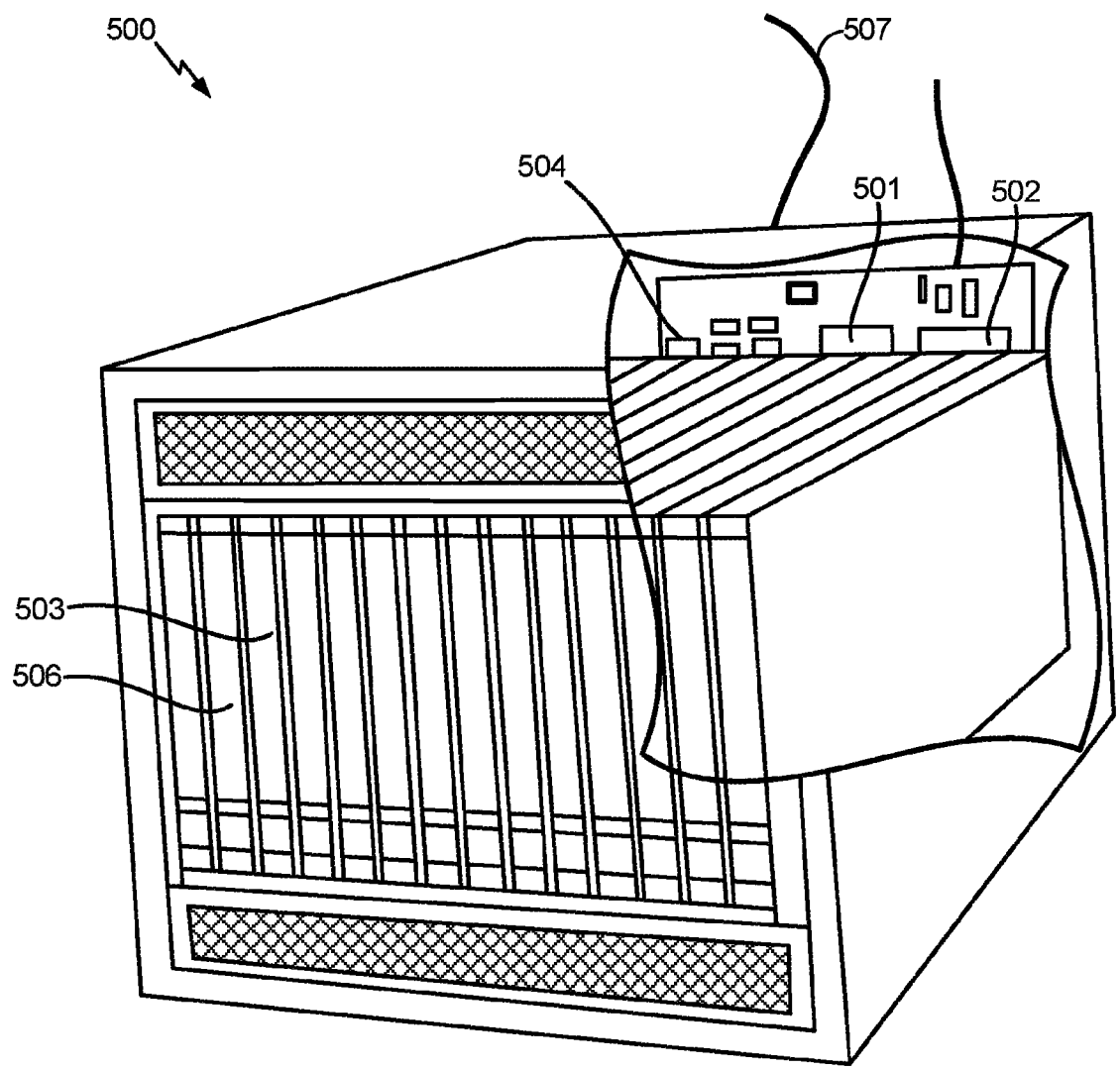
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 500 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

User application services involving concurrent transmission of voice and some other form of media (real-time or non-real time) are typically implemented by sending voice media as a separate independent stream. This is done for several reasons including providing positive user experience allocating preferential treatment, such as QoS, to voice packets. When voice packets are transmitted concurrently with real-time media such as video, the video stream is typically allocated a best effort (BE) without QoS. Thus, depending upon network conditions, the video packets may suffer packet loss, jitter, and/or delay. This results in an inconsistent user experience.

As used herein, a "QoS channel" is used to refer to a QoS communication link over any network type (e.g., a GBR QoS bearer in LTE, a traffic channel (TCH) with QoS reserved via an RonR message in EV-DO, etc.), and a "non-QoS channel" is used to refer to a communication link without QoS over any network type (e.g., a default non-GBR bearer in LTE, a TCH without QoS reserved in EV-DO, etc.). Further, in certain network configurations (e.g., EV-DO as in FIG. 2A, UMTS/W-CDMA as in FIGS. 2B-2C, etc.), the RAN 120 is responsible for assigning the QoS used by UEs, and in other network configurations (e.g., LTE as in FIG. 2D, etc.), the core network 140 is responsible for assigning the QoS used by UEs. Accordingly, reference to a "RAN-core network", denoted in the respective FIGS as RAN/Core Network 120/140, is used to refer to an entity in any network type that serves UEs and is responsible for assigning QoS thereto.

Figure 6:
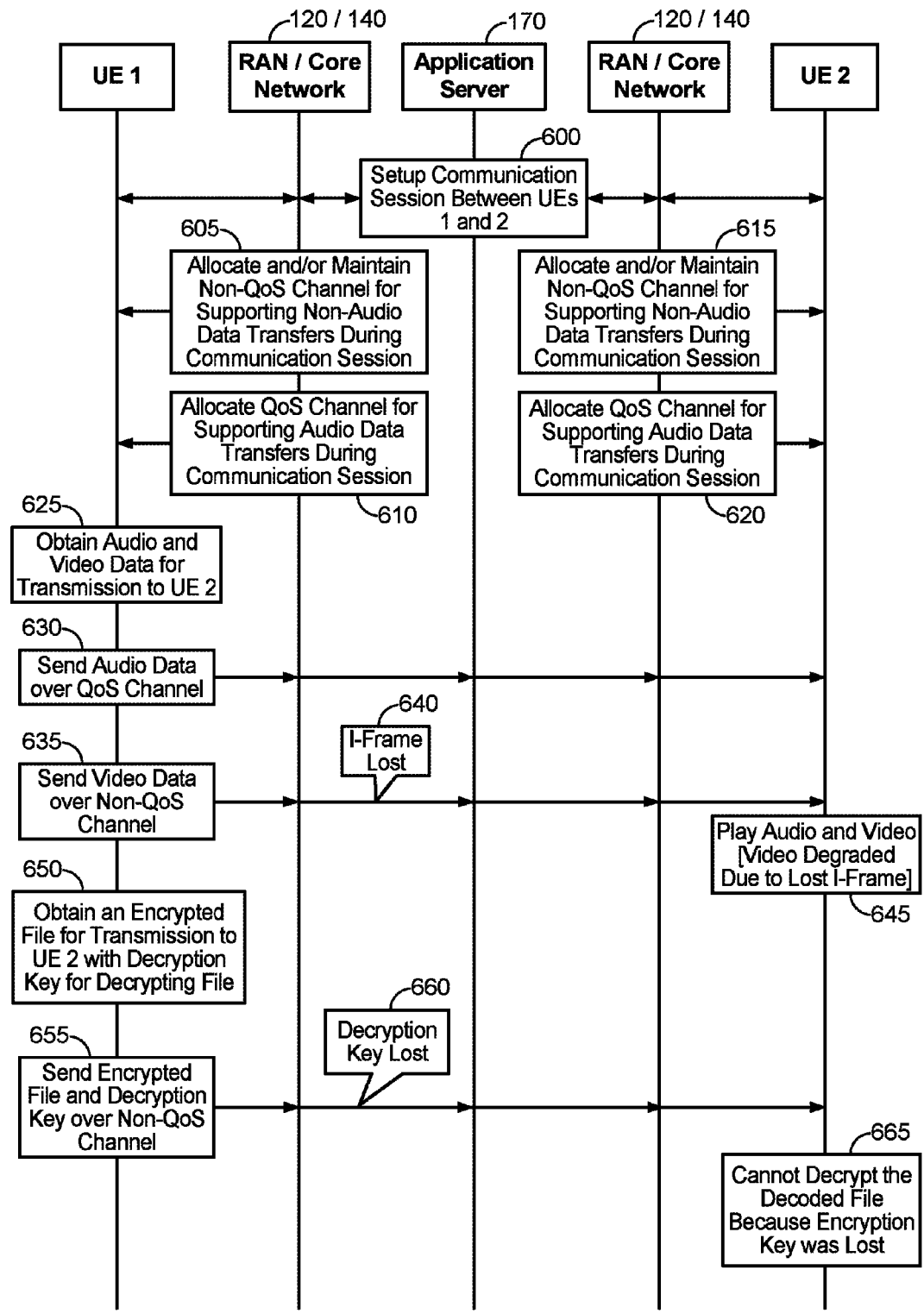
FIG. 6 illustrates a conventional process of supporting a server-arbitrated communication session with the above-noted resource allocation for audio and non-audio data.

In LTE networks as an example, audio data (e.g., voice media) is typically carried over a dedicated bearer with a certain GBR or QoS. Non-audio data (e.g., files or video) may expect the same treatment, but their bit-rate requirements may be higher in this case. Thus, it is unlikely that a UE can be assigned sufficient GBR to handle all of its audio and non-audio data for the session. FIG. 6 illustrates a conventional process of supporting a server-arbitrated communication session with the above-noted resource allocation for audio and non-audio data.

Referring to FIG. 6, the application server 170 sets up a communication session between at least UEs 1 and 2, 600. In an example, the communication session (e.g., a PTT call, a VoIP call, etc.) can also include one or more additional UEs, in which case the communication session is a group communication session. In conjunction with setting up the communication session, the RAN/core network serving UE 1 allocates and/or maintains a non-QoS channel for supporting UE 1's non-audio data transfers for the communication session, 605, and the RAN/core network serving UE 1 also allocates a QoS channel for supporting UE 1's audio data transfers for the communication session, 610. Similarly, in conjunction with setting up the communication session, the RAN/core network serving UE 2 allocates and/or maintains a non-QoS channel for supporting UE 2's non-audio data transfers for the communication session, 615, and the RAN/core network serving UE 2 also allocates a QoS channel for supporting UE 2's audio data transfers for the communication session, 620. In an example, at 605 or 615, if UE 1 and/or UE 2 have previously established the non-QoS channel (e.g., a default non-GBR bearer in LTE), the pre-established non-QoS channel can simply be maintained without any new resources being allocated to UE 1 and/or UE 2 for supporting non-audio data transfers for the communication session. The remainder of FIG. 6 provides an illustration of two distinct types of non-audio data (i.e., video data and file data) that can be sent over the non-QoS channel during the communication session.

Referring to FIG. 6, during the communication session, UE 1 obtains audio and video data for transmission to UE 2, 625. UE 1 thereby transmits a first stream of packets carrying the audio data that is obtained at 625 over the QoS channel allocated at 610, 630, and a second stream of packets carrying the video data that is obtained at 625 over the non-QoS channel from 610, 635. As will be appreciated, certain types of video data have a greater impact to video playback performance than other types of video data. For example, intermittent I-frames or I-slices are relatively important video frames that help to calibrate video playback. In FIG. 6, assume that one or more packets in the second stream of packets carrying one or more I-frames are lost at some point during transfer due at least in part to the lack of QoS on the non-QoS channel, 640. Accordingly, UE 2 receives the first and second streams of packets and plays the respective audio and video data contained therein, 645. However, at 645, the loss of the I-frame(s) from 640 causes degradation to the quality of the video that is played by UE 2.

Referring to FIG. 6, during the communication session, UE 1 obtains an encrypted file that is configured to be decrypted (or unlocked) with a decryption key for transmission to UE 2, 650. UE 1 thereby transmits both the encrypted file and its associated decryption key within the second stream of packets over the non-QoS channel from 610, 655. In FIG. 6, assume that one or more packets in the second stream of packets carrying the decryption key are lost at some point between UE 2's serving RAN/core network and the application server 170 due at least in part to the lack of QoS on the non-QoS channel, 660. Accordingly, at 665, UE 2 receives the second stream of packets at 655 with the encrypted file, but UE 2 cannot decrypt the encrypted file because the decryption key was lost at 660. Thus, even though the entire encrypted file was successfully transferred, the loss of the decryption key renders the encrypted file unusable.

As will be appreciated, while the non-QoS channel is used in FIG. 6 because sufficient QoS to handle both the audio and non-audio data is typically unavailable, the losses of certain higher-priority non-audio data (e.g., decryption keys, I-frames, header information, etc.) on the non-QoS channel can cause a disproportionately high degradation to the user experience at the target UE as compared to lower-priority non-audio data (e.g., B-frames, bulk encrypted files, etc.). Accordingly, embodiments of the invention are directed to identifying a subset of higher-priority (HP) non-audio data and allocating the HP non-audio data to the QoS channel instead of the non-QoS channel, while any remaining lower-priority (LP) non-audio data (if present) can remain on the non-QoS channel. The HP non-audio data can thereby be piggybacked onto and/or interleaved with the audio data being carried on the QoS channel during the communication session (e.g., during times when the QoS channel is being underutilized), and the HP non-audio data can be marked so that the target UE can distinguish between the HP non-audio data and the audio data on the QoS channel. These aspects are discussed in greater detail below with respect to FIGS. 7A through 12.

Figure 7A:
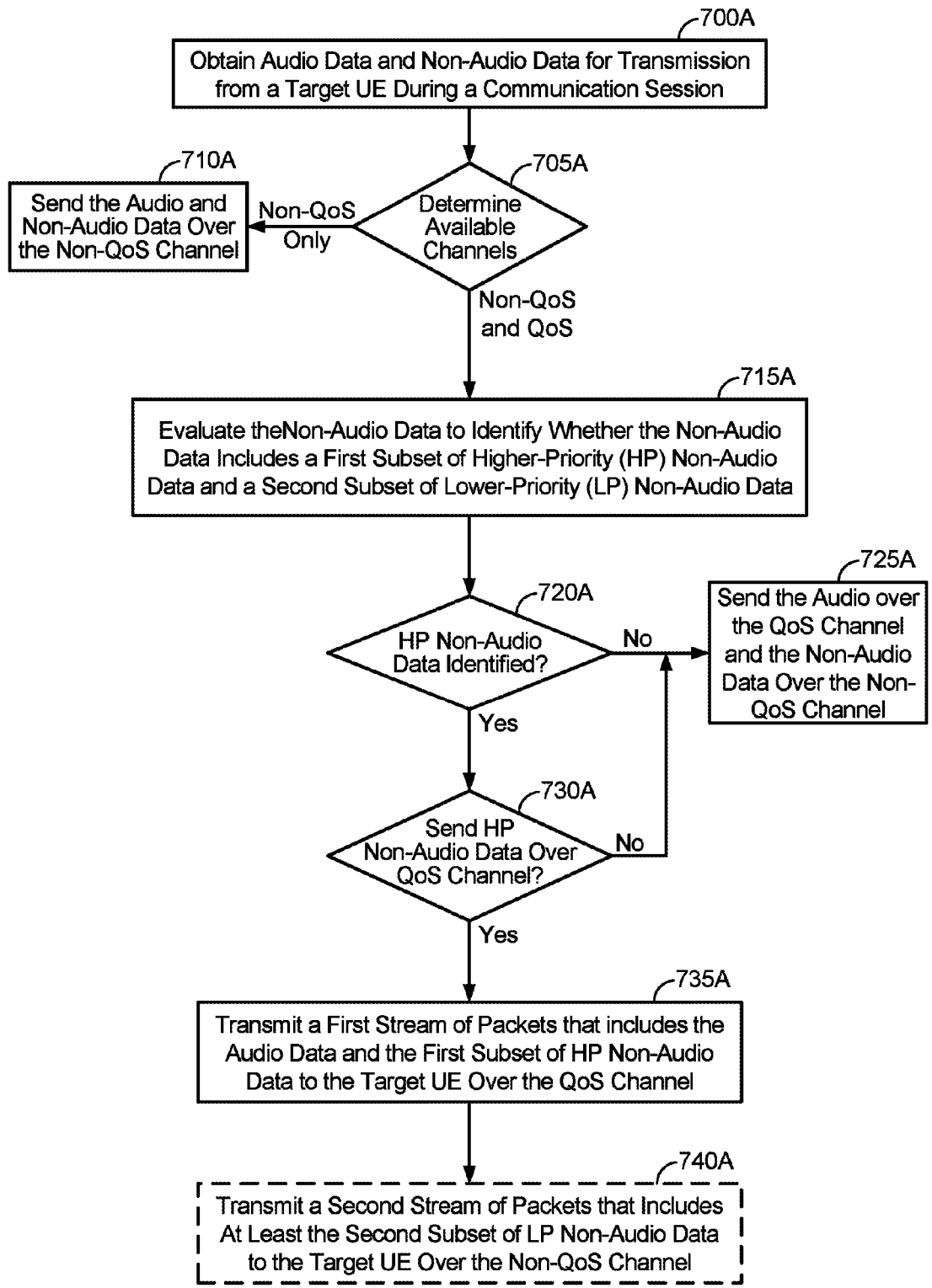
FIG. 7A illustrates a process by which a transmitting UE identifies and re-allocates a subset of higher-priority (HP) non-audio data from a non-Quality of Service (QoS) channel to a QoS channel for transmission to a target UE during a communication session in accordance with an embodiment of the invention.

FIG. 7A illustrates a process by which a transmitting UE identifies and re-allocates a subset of HP non-audio data from a non-QoS channel to a QoS channel for transmission to a target UE during a communication session in accordance with an embodiment of the invention. Referring to FIG. 7A, the transmitting UE obtains audio and non-audio data for transmission to the target UE, 700A. The audio and non-audio data obtained at 700A does not necessarily need to be obtained contemporaneously in an example (although this is certainly possible). For example, the non-audio data (e.g., a file, real-time video, etc.) can be obtained or captured during a lull in audio transmission, such as when a user of the transmitting is silent, when the transmitting UE is a non-floorholder in a half-duplex session and/or when the transmitting UE is muted.

At 705A, the transmitting UE determines which channels are currently available for the transmission of the audio and non-audio data, 705A. In particular, in the embodiment of FIG. 7A, it is assumed that the transmitting UE will have access to the non-QoS channel throughout the communication session, but that the QoS channel may or may not be available. For example, the QoS channel may not be available for a period of time during setup of the communication session, or the QoS channel may be allocated and later taken away and repurposed by the network. At 705A, if the transmitting UE determines that it currently has access to the non-QoS channel and not the QoS channel, the transmitting UE sends both the audio and non-audio data over the non-QoS channel using a best effort (BE) protocol, 710A. Otherwise, at 705A, if the transmitting UE determines that it currently has access to both the non-QoS channel and the QoS channel, instead of simply allocating the audio data to the QoS channel and allocating the non-audio data to the non-QoS channel as in FIG. 6, the transmitting UE evaluates the non-audio data to identify whether the non-audio data includes a first subset of HP non-audio data and (optionally) a second subset of LP non-audio data, 715A. With respect to FIG. 7, the evaluation of 715A may identify whether the non-audio data includes both the first and second subsets of LP and HP non-audio data, or alternatively that the non-audio data includes only LP non-audio data (e.g., none of the non-audio data is particularly important) or only HP non-audio data (e.g., the non-audio data corresponds to a file that has high priority in its entirety).

Many different types of non-audio data can potentially qualify as HP non-audio data. As used herein, HP non-audio data is defined as non-audio data with sufficient priority to trigger delivery on the QoS channel instead of the non-QoS channel, while LP non-audio data is defined as non-audio data without sufficient priority to trigger delivery on the QoS channel instead of the non-QoS channel even when the QoS channel is available. Table 2 (below) shows specific examples of non-audio data that can qualify as HP non-audio data in the context of the process of FIG. 7A:

TABLE 2

| HP Non-Audio Data Examples | | |
|---|---|---|
| Example Descriptor | HP Non-Audio Data Type | Relevance of Non-Audio Data Type |
| H.264 Video Example #1 | I-Frame or I-Slice | Prevents error propagation when video packets are lost or delayed |
| H.264 Video Example #2 | Header Information (e.g., macroblock (MB) type, quantization parameters and/or motion vectors) | Helpful to decoder at target UE for correcting decoding of video frame(s) |
| H.264 Video Example #3 | Sequence Parameter Set (SPS) | Contains information related to a sequence to a sequence of pictures (e.g., all pictures between two IDR pictures) |
| H.264 Video Example #4 | Picture Parameter Set (PPS) | Contains information related to all the frames or slices belonging to a single picture |
| H.264 Video Example #5 | Redundant frames or slices | Alternate representation of a picture frame or slice via a lower quantization size |
| H.264 Video Example #6 | Lip Sync Info | Wall clock information in RTCP packets |
| File Transfer Example #1 | Decryption Key | Helps to decrypt an associated encrypted file |

TABLE 2-continued

| HP Non-Audio Data Examples | | |
|---|---|---|
| Example Descriptor | HP Non-Audio Data Type | Relevance of Non-Audio Data Type |
| File Transfer Example #2 | Header Information (e.g., file size, file type or MIME type, a thumbnail version of an image) | Helpful to decoder at target UE for correcting decoding of a transferred file |
| File Transfer Example #3 | Entire Password File | Self-contained file that includes high priority content |

Referring to FIG. 7A, based on the evaluation at 715A, the transmitting UE determines whether HP non-audio data has been identified, 720A. If the transmitting UE determines that no HP non-audio data has been identified at 720A, the audio data is sent over the QoS channel and the non-audio data is sent over the non-QoS channel, 725A (e.g., similar to 630 and 635 in FIG. 6). Alternatively, if the transmitting UE determines that HP non-audio data is identified at 720A, the transmitting UE determines whether to transmit the identified HP non-audio data over the QoS channel instead of the non-QoS channel, 730A.

Referring to FIG. 7A, the decision logic of 730A can be based on a channel allocation rule. In an example, the channel allocation rule can instruct the transmitting UE to transmit all identified HP non-audio over the QoS channel (i.e., irrespective of a level of utilization on the QoS channel). Alternatively, the channel allocation rule can instruct the transmitting UE to transmit any identified HP non-audio over the QoS channel only if the QoS channel is being underutilized. For example, the QoS channel is likely to be highly utilized if a user of the transmitting UE is speaking and audio is actively being transmitted by the transmitting UE to the target UE. However, voice traffic is typically bursty in nature, such that low utilization can be inferred if voice activity is low (or if the transmitting UE does not have the floor for a half-duplex call). As will be described in more detail with respect to FIG. 7B below, a decision engine can be notified with respect to the current voice activity level to facilitate the channel allocation rule that triggers HP non-audio data over the QoS channel. If the transmitting UE determines not to transmit the identified HP non-audio data over the QoS channel at 730A, the audio data is sent over the QoS channel and the non-audio data (e.g., the HP non-audio data and any LP non-audio data) is sent over the non-QoS channel, 725A (e.g., similar to 630 and 635 in FIG. 6). Alternatively, if the transmitting UE determines to transmit the identified HP non-audio data over the QoS channel at 730A, the process advances to 735A.

At 735A, the transmitting UE transmits a first stream of packets over the QoS channel, whereby the first stream of packets includes both (i) the audio data obtained at 700A, and (ii) the HP non-audio data identified at 715A. As discussed above, the identified HP non-audio data can be inserted into the first stream of packets during a period where the audio or voice utilization on the QoS channel is low, such that the transmission of 735A can primarily include the audio data (e.g., during high audio utilization on the QoS channel) for a period of time and can primarily include the HP non-audio data during another period of time (e.g., during low audio utilization on the QoS channel). Thus, the proportion of the audio data to the HP non-audio data can vary, and at certain times can be associated with an exclusive transmission of the audio data or the HP non-audio data within the first stream of packets.

Further, in conjunction with the transmission of 735A, the transmitting UE can mark the packets within the first stream of packets to identify which packets carry the audio data and which packets carry the HP non-audio data to permit the target UE to correctly associate the audio data and HP non-audio data within the first stream of packets. For example, the marking can be accomplished by adding a flag to headers of packets carrying the HP non-audio data, by adding a flag to headers of packets carrying the audio data, or both. Also, it is possible that certain 'hybrid' packets (e.g., RTP packets) include some audio data and some HP non-audio data. In this case, the hybrid packets can be marked so as to indicate their hybrid status, or alternatively the individual audio and HP non-audio frames within the hybrid packets can be marked to indicate their audio or HP non-audio association on a frame-specific basis. In a further example, the packet marking can be implemented for RTP packets by assigning a special payload type in the RTP header for non-audio data (e.g., video data, etc.) so that the non-audio packets in the first stream of packets can utilize the QoS channel by using the same RTP session as the audio data while still indicating their non-audio status to the target UE. In an alternative example, the packet marking can be implemented for RTP packets via an RTP extension header for the non-audio packets within the first stream of packets so that the non-audio packets can use the same RTP session as the audio data while still indicating their non-audio status to the target UE.

At 740A, the transmitting UE also optionally transmits a second stream of packets that includes at least the second subset of LP non-audio data. The transmission of 740A is optional because the identified HP non-audio data can potentially include the entirety of the non-audio data obtained at 700A (e.g., see File Transfer Example #3 from Table 2, above). However, if the HP non-audio data corresponds to only a portion of the non-audio data obtained at 700A, any remaining LP non-audio data can be transmitted within the second stream of packets at 740A. Also, in a further example, the HP non-audio data which is transmitted in the first stream of packets over the QoS channel at 735A can also be redundantly transmitted over the non-QoS channel at 740A.

Figure 7B:
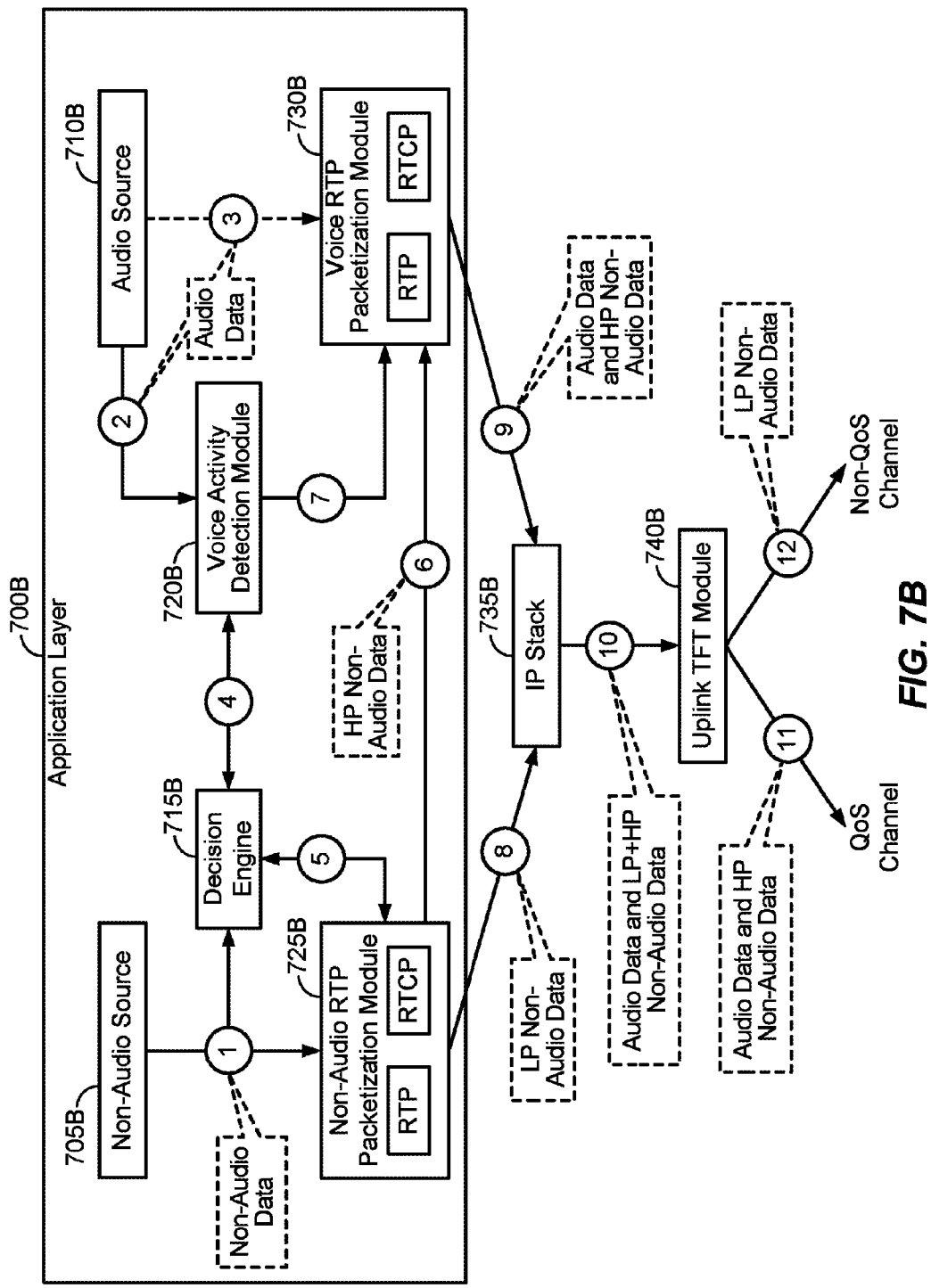
FIG. 7B illustrates an example configuration of the transmitting UE performing the process of FIG. 7A in accordance with an embodiment of the invention.

FIG. 7B illustrates an example configuration of the transmitting UE in accordance with an embodiment of the invention. In particular, FIG. 7B illustrates the process of FIG. 7A being implemented over the associated UE configuration using real-time transport protocol (RTP) where the audio data is voice data.

Referring to FIG. 7B, an application layer 700B of the transmitting UE includes a non-audio source 705B, an audio source 710B, a decision engine 715B, a voice activity detection module 720B, a non-audio RTP packetization module 725B and a voice RTP packetization module 730B. The non-audio source 705B (e.g., a client application configured to capture video or to identify files for transfer, etc.) provides non-audio data (e.g., video, files, etc.) to the decision engine 715B and also to the non-audio RTP packetization module 725B via interface 1 (e.g., as in 700A of FIG. 7A). The audio source 710B (e.g., a client application configured to capture audio or to manage audio sessions, which can be the same as the non-audio source 705B in an example) provides audio data to the voice activity detection module 720B and also to the voice RTP packetization module 730B via interfaces 2 and 3, respectively (e.g., as in 700A of FIG. 7A).

The voice activity detection module 720B analyzes the audio data from interface 2 and determines if a threshold level of voice activity is present in the audio data. The voice activity detection module 720B notifies the decision engine 715B if the threshold level of voice activity is exceeded via interface 4. In the embodiment of FIG. 4, assume that the decision engine 715B decides to move HP non-audio data from the non-QoS channel to the QoS channel based on an indication from the voice activity detection module 720B indicating that the threshold level of voice activity is exceeded (e.g., as in 730A of FIG. 7A). Accordingly, the decision engine 715B identifies any non-audio data in the non-audio data received via interface 1 (e.g., as in 715A and 720A of FIG. 7A) and instructs the non-audio RTP packetization module 725B, via interface 5, to forward the identified HP non-audio data to the voice RTP packetization module 730B via interface 6. Meanwhile, the decision engine 715B also notifies the voice activity detection module 720B that HP non-audio data is going to be packetized along with audio data on the QoS channel, and the voice activity detection module 720B forwards this information to the voice RTP packetization module 730B via interface 7. The non-audio RTP packetization module 725B packetizes the LP non-audio data and sends the packetized LP non-audio data to an IP stack 735B via interface 8. The non-audio RTP packetization module 725B packetizes both the audio data and the HP non-audio data and sends the packetized audio data and HP non-audio data to the IP stack 735B via interface 9. The IP stack 735B delivers the packetized audio data, HP non-audio data and LP non-audio data to an uplink traffic flow template (TFT) module 740B via interface 10. The uplink TFT module 740B transmits a first stream of packets including the packetized audio data and HP non-audio data via the QoS channel or interface 11 (e.g., as in 735A of FIG. 7A), and the uplink TFT module 740B also transmits a second stream of packets including the packetized LP non-audio data via the non-QoS channel or interface 12 (as in 740A of FIG. 7A).

Figure 8A:
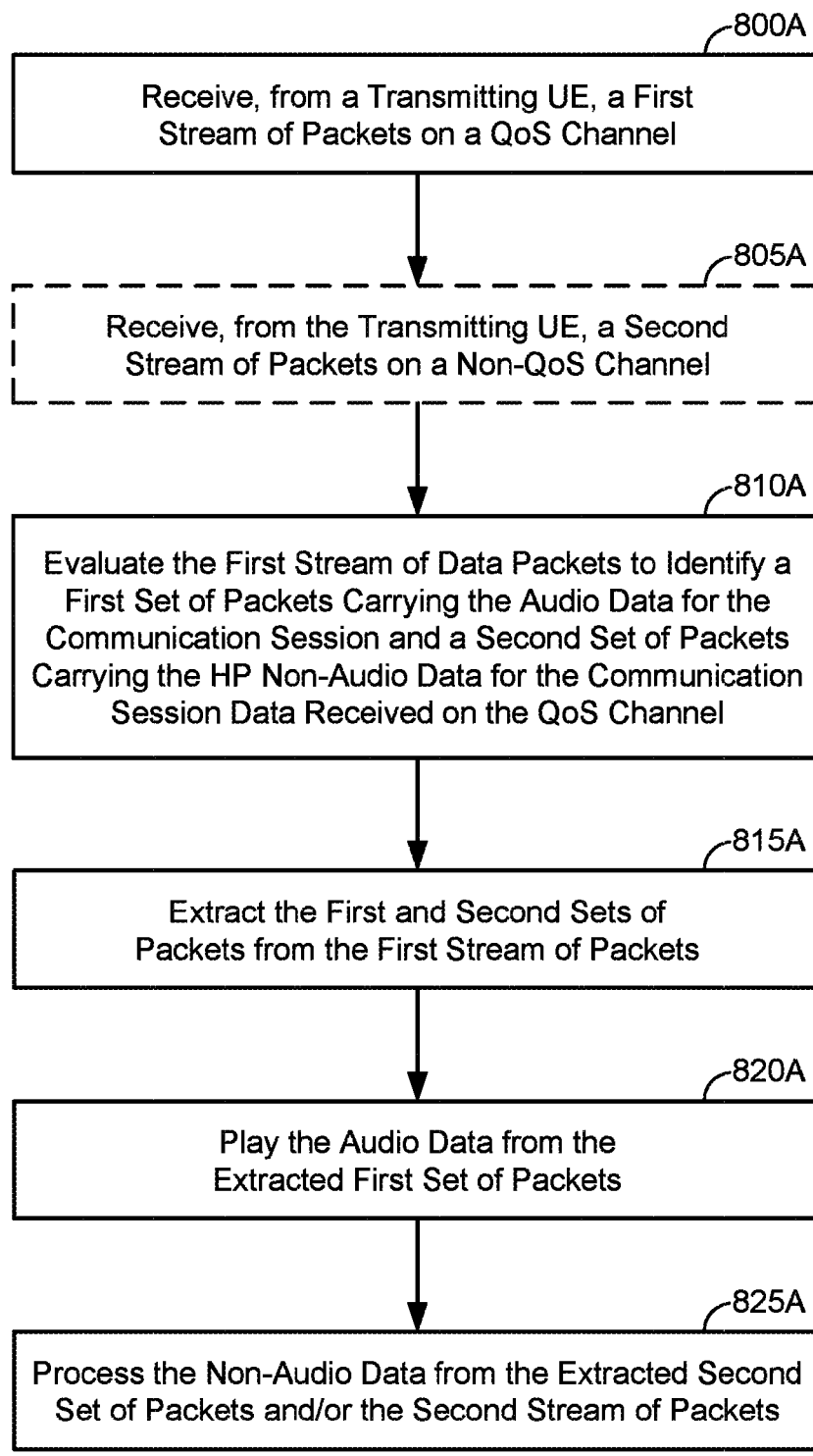
FIG. 8A illustrates a process by which a target UE identifies and extracts HP non-audio data from the QoS channel in accordance with an embodiment of the invention.

FIG. 8A illustrates a process by which a target UE identifies and extracts HP non-audio data from the QoS channel in accordance with an embodiment of the invention. In particular, FIG. 8A illustrates operation of the target UE when the transmitting UE transmits the HP non-audio data via the QoS channel at 735A of FIG. 7A.

Referring to FIG. 8A, assume that both the non-QoS channel and the QoS channel between the target and transmitting UEs are active. Under this assumption, the target UE receives a first stream of packets over the QoS channel, 800A, whereby the first stream of packets corresponds to the first stream of packets transmitted by the transmitting UE at 735A of FIG. 7A. The target UE also optionally receives a second stream of packets, 805A, whereby the second stream of packets corresponds to the second stream of packets optionally transmitted by the transmitting UE at 740A of FIG. 7A. As noted above, the reception of 805A is optional because the identified HP non-audio data can potentially include the entirety of the non-audio data obtained at 700A of FIG. 7A (e.g., see File Transfer Example #3 from Table 2, above). However, if the HP non-audio data corresponds to only a portion of the non-audio data obtained at 700A of FIG. 7A, any remaining LP non-audio data can be received within the second stream of packets at 800A. Also, in a further example, the HP non-audio data received in the first stream of packets over the QoS channel at 800A can also be redundantly received over the non-QoS channel at 805A as part of the second stream of packets as well.

Referring to FIG. 8A, the target UE evaluates the first set of packets to identify a first set of packets carrying the audio data for the communication session and a second set of packets carrying the HP non-audio data for the communication session, 810A. For example, as discussed above with respect to FIG. 7A, the transmitting UE can mark any HP non-audio packets with flags to facilitate the target UE to distinguish between the first and second sets of packets within the first stream of packets on the QoS channel. The target UE can then identify these flags at 810A to extract the first and second sets of packets. Accordingly, at 815A, the target UE extracts the first and second sets of packets from the first stream of packets. The target UE plays the audio from the extracted first set of packets, 820A, and the target UE also processes the HP non-audio data from the extracted second set of packets along with any LP non-audio data from the second stream of packets, 825A. For example, if the LP and HP non-audio data correspond to video data, the processing that occurs at 825A can include merging the LP and HP video data received on the non-QoS and QoS channels, respectively, and then playing the merged video in conjunction with the playback of the audio at 820A. In another example, if the LP and HP non-audio data corresponds to an encrypted file and a decryption key, respectively, the processing that occurs at 825A can include decrypting the encrypted file using the encryption key.

Figure 8B:
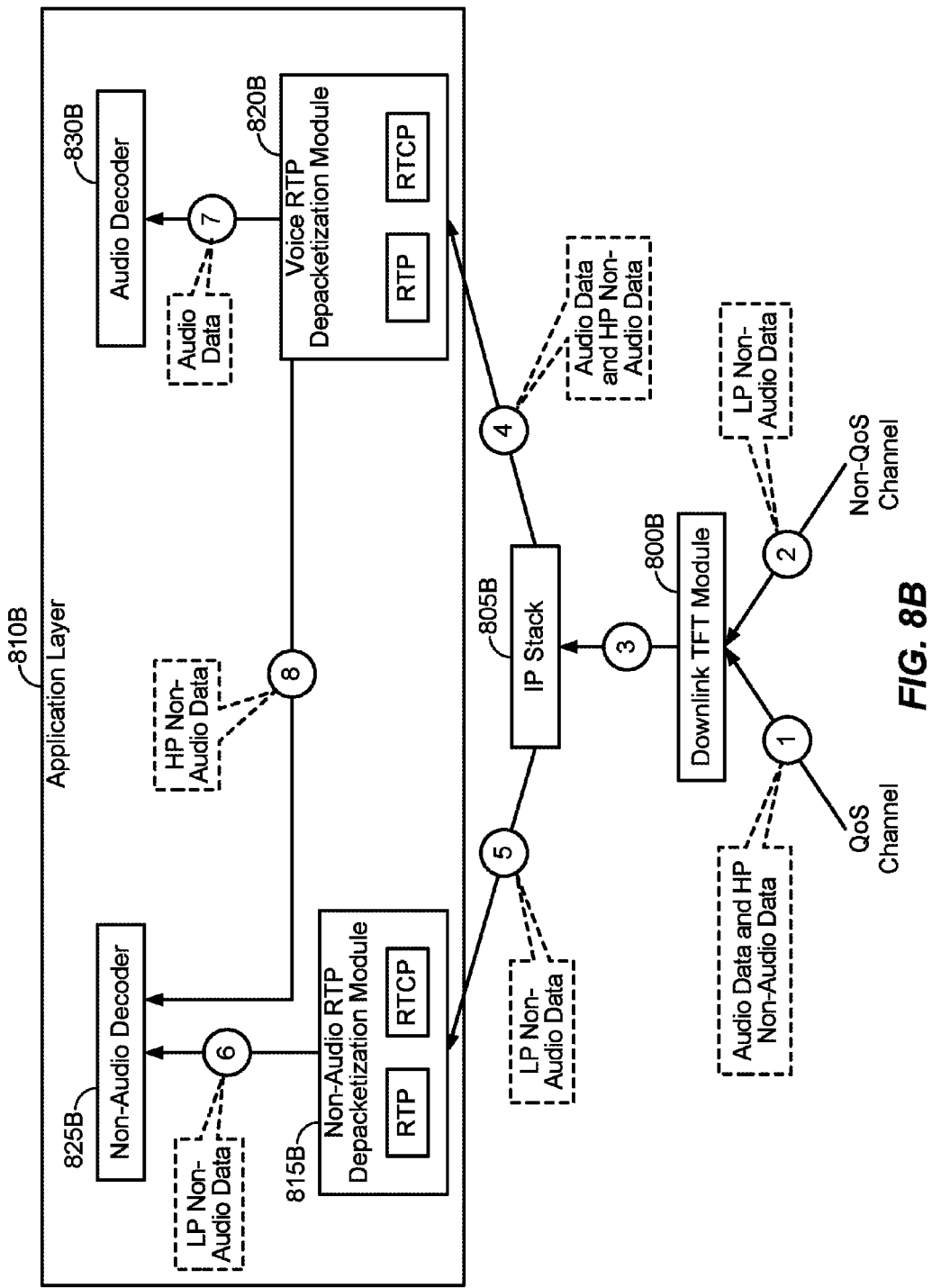
FIG. 8B illustrates an example configuration of the target UE performing the process of FIG. 8A in accordance with an embodiment of the invention.

FIG. 8B illustrates an example configuration of the target UE in accordance with an embodiment of the invention. In particular, FIG. 8B illustrates the process of FIG. 8A being implemented over the associated UE configuration using RTP where the audio data is voice data. The target UE in FIG. 8B includes a downlink TFT module 800B, an IP stack 805B and an application layer 810B. The application layer 810B includes a non-audio RTP depacketization module 815B, a voice RTP depacketization module 820B, a non-audio decoder 825B and an audio decoder 830B.

Referring to FIG. 8B, the downlink TFT module 800B receives the first stream of packets with the audio data and HP non-audio data via the QoS channel (or interface 1) (e.g., as in 800A of FIG. 8A), and the downlink TFT module 800B also receives the LP non-audio data via the non-QoS channel (or interface 2) (e.g., as in 805A of FIG. 8A). The downlink TFT module 800B forwards the first and second streams of packets to the IP stack 805B via interface 3. The IP stack 805B forwards the first stream of packets to the voice RTP depacketization module 820B via interface 4, and the IP stack 805B forwards the second stream of packets to the non-audio RTP depacketization module 815B via interface 5. The non-audio RTP depacketization module 815B depacketizes the second stream of packets and forwards the depacketized second stream of packets to the non-audio decoder 825B via interface 6. The voice RTP depacketization module 820B identifies, within the stream of packets, a first set of packets carrying the audio data and a second set of packets carrying the HP non-audio data (e.g., based on packet markings as discussed above). The RTP depacketization module 820B depacketizes the first and second sets of packets from the first stream of packets (e.g., as in 815A of FIG. 8A), and then forwards the depacketized first set of packets to the audio decoder 830B via interface 7 and forwards the depacketized second set of packets to the non-audio decoder 825B via interface 8. The audio decoder 830B decodes the depacketized first set of packets to facilitate playback of the audio data, while the non-audio decoder 825B decodes the depacketized second stream of packets and the depacketized first set of packets to facilitate the processing of the LP and HP non-audio data (e.g., as in 825A of FIG. 8A).

Figure 9:
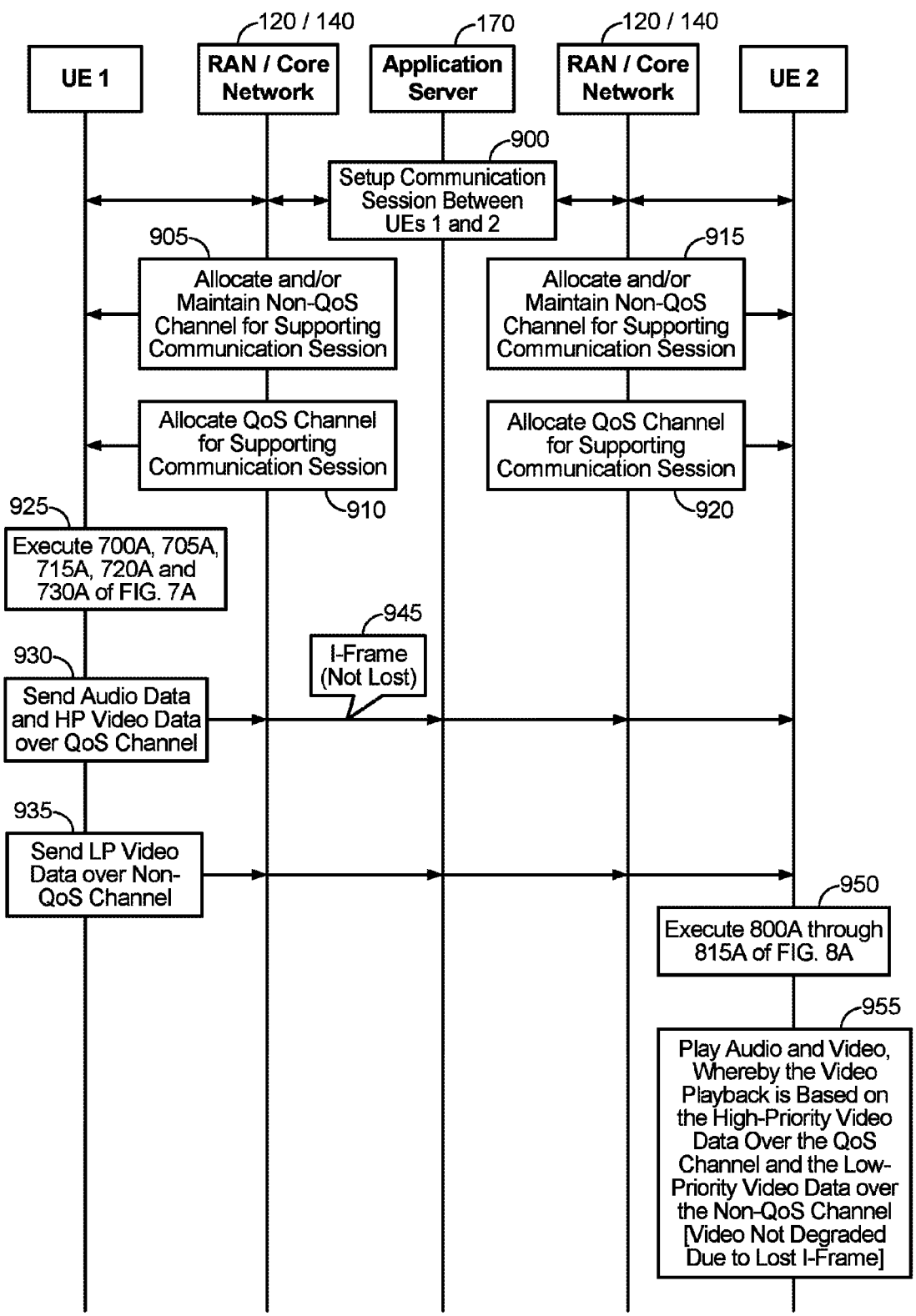
FIG. 9 illustrates an example implementation of FIGS. 7A and 8A with respect to a video conference in accordance with an embodiment of the invention.

FIG. 9 illustrates an example implementation of FIGS. 7A and 8A with respect to a video conference in accordance with an embodiment of the invention. In FIG. 9, UE 1 corresponds to the transmitting UE from FIG. 7A and UE 2 corresponds to the target UE from FIG. 8A. 900 through 920 of FIG. 9 substantially correspond to 600 through 620 of FIG. 6 and will not be described further for the sake of brevity.

Referring to FIG. 9, under the assumption that the non-audio data obtained at 700A is video data including HP video data and LP video data, UE 1 executes 700A, 705A, 715A, 720A and 730A of FIG. 7A at 925. At this point, instead of transmitting the audio data over the QoS channel and transmitting all of the video data over the non-QoS channel as at 630 and 635 of FIG. 6, UE 1 transmits the audio data and the HP video data over the QoS channel, 930 (e.g., as in 735A of FIG. 7A), and UE 1 transmits the LP video data over the non-QoS channel, 935 (e.g., as in 740A of FIG. 7A). In particular, assume that the HP video data includes one or more I-frames, which unlike 640 of FIG. 6, are not lost in the process of FIG. 9 because the HP video data is sent via the QoS channel instead of the non-QoS channel, 945. Next, at 950, UE 2 executes 800A through 815A of FIG. 8A. UE 2 then plays the audio and video received over the first and second streams of packets on the QoS and non-QoS channels, 955 (e.g., as in 820A and 825A of FIG. 8A), whereby the video playback does not experience the errors discussed above with respect to 645 of FIG. 6 because the I-frame in FIG. 9 is transferred without error via the QoS channel.

Figure 10:
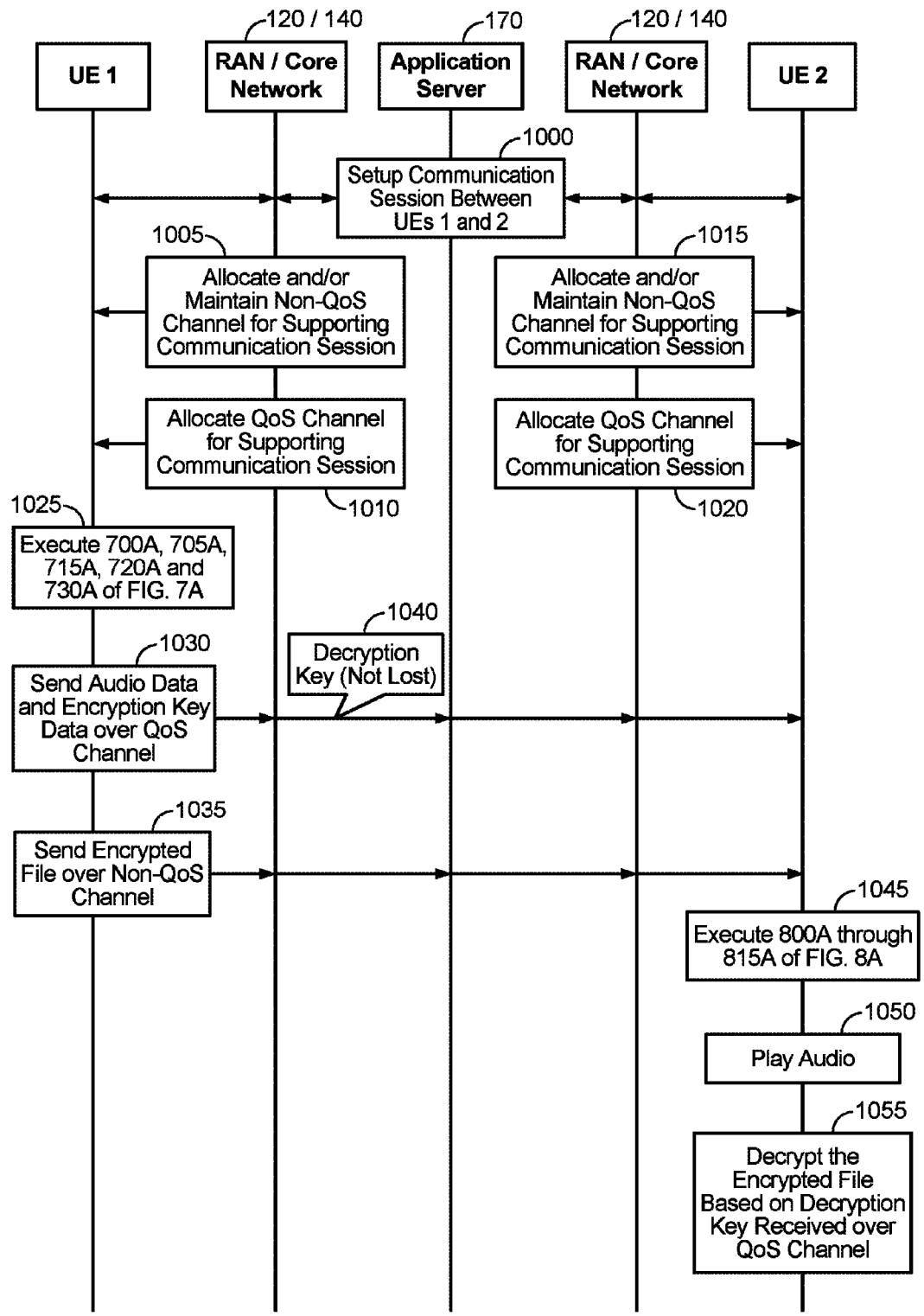
FIG. 10 illustrates an example implementation of FIGS. 7A and 8A with respect to an audio conference in accordance with an embodiment of the invention.

FIG. 10 illustrates an example implementation of FIGS. 7A and 8A with respect to an audio conference in accordance with an embodiment of the invention. In FIG. 10, UE 1 corresponds to the transmitting UE from FIG. 7A and UE 2 corresponds to the target UE from FIG. 8A. 1000 through 1020 of FIG. 10 substantially correspond to 600 through 620 of FIG. 6 and will not be described further for the sake of brevity.

Referring to FIG. 10, under the assumption that the non-audio data obtained at 700A is a file package including an encrypted file as the LP non-audio data and a decryption key as the HP non-audio data, UE 1 executes 700A, 705A, 715A, 720A and 730A of FIG. 7A at 1025. At this point, instead of transmitting the audio data over the QoS channel and transmitting the entire file package over the non-QoS channel as at 655 of FIG. 6, UE 1 transmits the audio data and the decryption key over the QoS channel, 1030 (e.g., as in 735A of FIG. 7A), and UE 1 transmits the encrypted file over the non-QoS channel, 1035 (e.g., as in 740A of FIG. 7A). Therefore, unlike 655 of FIG. 6, the decryption key is not lost in the process of FIG. 10 because the decryption key is sent via the QoS channel instead of the non-QoS channel, 1040. Next, at 1045, UE 2 executes 800A through 815A of FIG. 8A. UE 2 then plays the audio received over the first stream of packets on the QoS channel, 1050 (e.g., as in 820A of FIG. 8A), and UE 2 also decrypts the encrypted file based on the decryption key, 1055 (e.g., as in 825A of FIG. 8A).

As will be appreciated, FIG. 10 corresponds to an example implementation based upon File Transfer Example #2 from Table 2 (above), whereby the HP non-audio data corresponds to a decryption key to decrypt an associated encrypted file. In this case, both the encrypted file and the decryption key need to be conveyed to UE 2 for UE 2 to be able to decrypt the encrypted file. In an alternative to FIG. 10, the process of FIG. 10 can be modified slightly to conform to the thumbnail image aspect from the File Transfer Example #2 from Table 2 (above) whereby the HP non-audio data is specifically generated based on the availability of the QoS channel and would not otherwise be sent if only the non-QoS channel were available. In other words, a relatively large image file can be transferred on the non-QoS channel, and if the QoS channel is deemed available (and is not being fully utilized), a thumbnail image can be generated based on the large file image and transmitted on the QoS channel as the HP non-audio data so that the thumbnail image can be quickly loaded by UE 2 while UE 2 waits to receive the large image file on the slower non-QoS channel. Thereby, the HP non-audio data does not necessarily correspond to a subset of the non-audio data that is obtained for transmission on the QoS channel, but in at least one embodiment can be configured to supplement or enhance the LP non-audio data for scenarios where the QoS channel is available.

Figure 11:
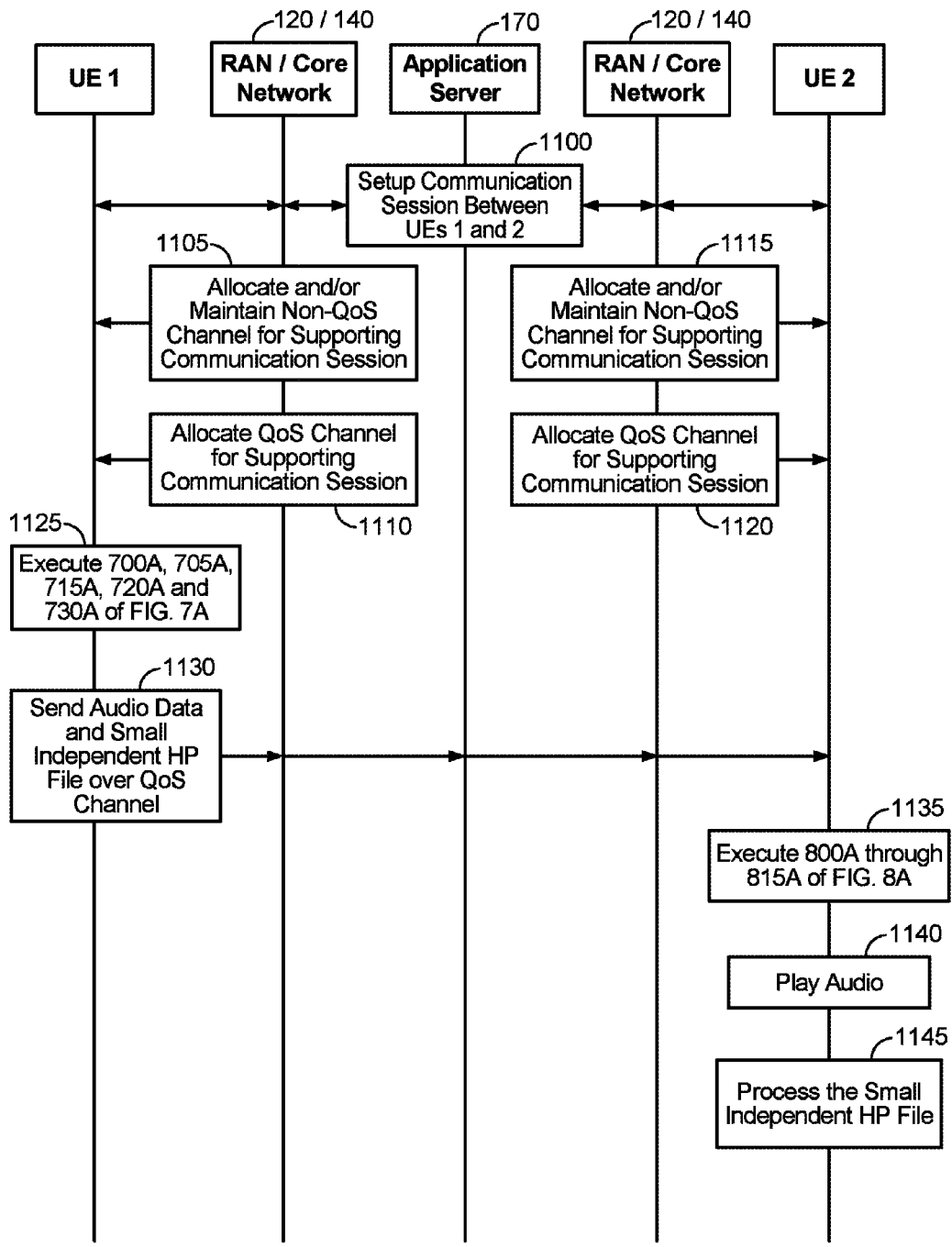
FIG. 11 illustrates an example implementation of FIGS. 7A and 8A with respect to an audio conference in accordance with another embodiment of the invention.

While FIGS. 9 and 10 are directed to implementations of the processes of FIGS. 7A and 8A whereby the HP non-audio data is sent in conjunction with LP non-audio data, it is also possible that the non-audio data in its entirety is deemed to be HP, in which case the HP non-audio data can be sent without any accompanying LP non-audio data (e.g., see File Transfer Example #3 from Table 2, above). With this in mind, FIG. 11 illustrates an example implementation of FIGS. 7A and 8A with respect to an audio conference in accordance with another embodiment of the invention. In FIG. 11, UE 1 corresponds to the transmitting UE from FIG. 7A and UE 2 corresponds to the target UE from FIG. 8A. 1100 through 1120 of FIG. 11 substantially correspond to 600 through 620 of FIG. 6 and will not be described further for the sake of brevity.

Referring to FIG. 11, under the assumption that the non-audio data obtained at 700A is a small independent HP file package, UE 1 executes 700A, 705A, 715A, 720A and 730A of FIG. 7A at 1125. UE 1 transmits the audio data and the entirety of the small independent HP file package over the QoS channel, 1130 (e.g., as in 735A of FIG. 7A), and UE 1 does not transmit any portion of the small independent HP file package over the non-QoS channel (e.g., optional 740A of FIG. 7A is not performed, although it is possible that data unrelated to the small independent HP file package is sent over the non-QoS channel and/or alternatively that the small independent HP file package is sent redundantly on the non-QoS channel). Next, at 1135, UE 2 executes 800A through 815A of FIG. 8A. UE 2 then plays the audio received over the first stream of packets on the QoS channel, 1140 (e.g., as in 820A of FIG. 8A), and UE 2 also processes the small independent HP file package, 1145 (e.g., as in 825A of FIG. 8A).

While FIGS. 9, 10 and 11 are directed to implementations of the processes of FIGS. 7A and 8A whereby the QoS channel is assumed to be available throughout the communication session, it is also possible that the QoS channel is unavailable (or inactive) during at least a portion of the communication session. For example, the QoS channel may not be available for a period of time during setup of the communication session, or the QoS channel may be allocated and later taken away and repurposed by the network. Thus, the status of the QoS channel can potentially be somewhat varying or unpredictable during the communication session, as shown below with respect to FIG. 12.

Figure 12:
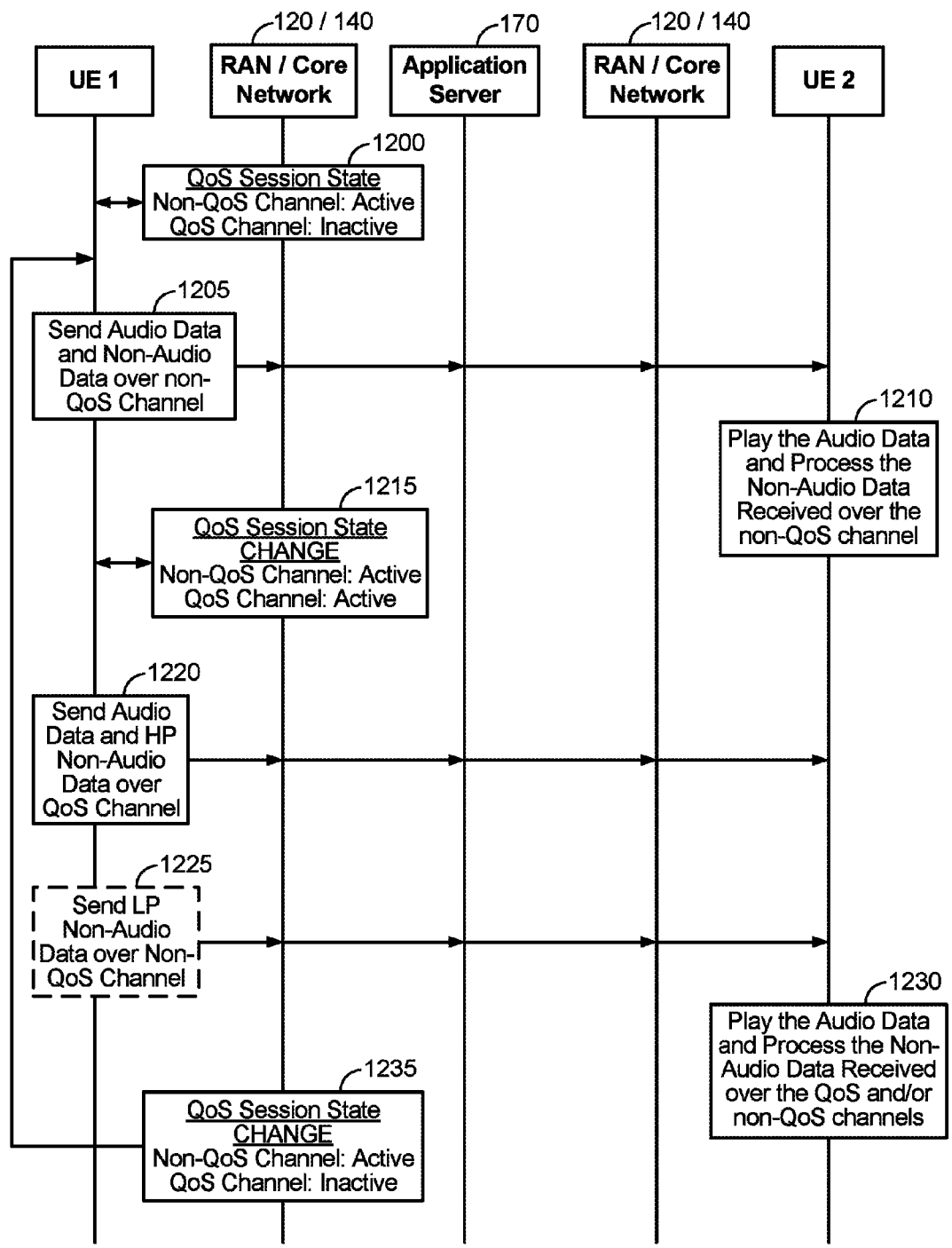
FIG. 12 illustrates a process of adjusting to QoS channel status changes during any of the communication sessions from FIG. 7A, 8A, 9, 10 or 11 in accordance with an embodiment of the invention.

Referring to FIG. 12, assume that any of the above-noted communication sessions from FIGS. 7A through 11 is active, and that a current QoS session state corresponds to an active non-QoS channel and an inactive QoS channel, 1200. In other words, at 1200, UE 1 does not have access to the QoS channel for its communication session with UE 2. With this in mind, UE 1 executes 700A, 705A and 710A from FIG. 7A and transmits both the audio and non-audio data for the communication session over the non-QoS channel, 1205. UE 2 receives both the audio and non-audio data for the communication session over the non-QoS channel, plays the received audio data and processes the received non-audio data, 1210.

At some later point during the communication session, assume that UE 1 undergoes a QoS session state transition that sets the current QoS session state to an active non-QoS channel and an active QoS channel, 1215. For example, the QoS session state transition can be triggered by the RAN/core network granting QoS to UE 1 during call setup, the RAN/core network granting QoS to UE 1 during an in-call phase of the communication session, and so on. At this point, UE 1 has access to the QoS channel for its communication session with UE 2. With this in mind, UE 1 executes 700A, 705A, 715A, 720A, 730A and 735A from FIG. 7A and transmits the audio and HP non-audio data for the communication session over the QoS channel, 1220. UE 1 can also execute 740A of FIG. 7A so as to transmit the LP non-audio data to UE 2 over the non-QoS channel, 1225. UE 2 receives the audio and HP non-audio data over the QoS channel and (optionally) receives the LP non-audio data over the non-QoS channel, such that UE 2 executes 800A and 815A through 820A, whereby UE 2 plays the received audio data and processes the received HP non-audio data, 1230 (e.g., and potentially the LP non-audio data as well if 805A and 825A of FIG. 8A are executed).

At some later point during the communication session, assume that UE 1 undergoes another QoS session state transition that sets the current QoS session state back to an active non-QoS channel and an inactive QoS channel, 1235 (e.g., similar to the QoS session state from 1200). For example, the QoS session state transition can be triggered by the RAN/core network withdrawing a previous allocation of QoS to UE 1 during an in-call phase of the communication session, and so on. In response to the QoS session state transition of 1235, the process returns to 1205.

While the above-described embodiments of the invention primarily relate to server-arbitrated communication sessions, it will be appreciated that other embodiments of the invention can correspond to sessions that are not arbitrated by a server that is external to the carrier network, such as sessions arbitrated by the carrier network itself, P2P sessions or sessions over a mesh network, and so on. Further, those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a user equipment (UE) engaged in a communication session with one or more other UEs, comprising:
    receiving a first stream of packets from the one or more other UEs on a Quality of Service (QoS) channel on which audio traffic is primarily carried during the communication session, wherein the communication session is supported at the UE at least in part via the QoS channel and also via a non-QoS channel on which non-audio traffic is carried;
    receiving a second stream of packets from the one or more other UEs on the non-QoS channel;
    evaluating the first stream of packets to identify (i) a first set of packets carrying audio data for the communication session and (ii) a second set of packets carrying higher-priority non-audio data for the communication session;
    evaluating the second stream of packets to identify lower-priority non-audio data;
    extracting the first and second sets of packets from the first stream of packets in response to the evaluation;
    playing the audio data from the extracted first set of packets; and
    processing the higher-priority non-audio data from the extracted second set of packets,
    wherein the higher-priority non-audio data from the extracted second set of packets and the lower-priority non-audio data are associated with a video portion of the communication session, wherein the processing includes playing, in association with the playing of the audio data, the video portion based on the higher-priority non-audio data from the extracted second set of packets and the lower-priority non-audio data, wherein the higher-priority non-audio data from the extracted second set of packets includes, for the video portion of the communication session, one or more (i) I-slices or I-frames, (ii) header information including indications of macroblock (MB) type, quantization parameters and/or motion vectors, (iii) sequence parameter set (SPS) information, (iv) picture parameter set (PPS) information, (v) redundant slices or frames and/or (vi) lip synchronization information, or
    wherein the lower-priority non-audio data includes an encrypted file and the higher-priority non-audio data from the extracted second set of packets includes a decryption key configured to decrypt the encrypted file, and wherein the processing includes decrypting the encrypted file using the decryption key.

2. The method of claim 1, wherein the higher-priority non-audio data from the extracted second set of packets is redundantly received on the non-QoS channel within the second stream of packets.

3. The method of claim 1, wherein the higher-priority non-audio data from the extracted second set of packets includes, for the video portion of the communication session, the one or more (i) the I-slices or I-frames, (ii) the header information including indications of macroblock (MB) type, the quantization parameters and/or motion vectors, (iii) the sequence parameter set (SPS) information, (iv) the picture parameter set (PPS) information, (v) the redundant slices or frames and/or (vi) the lip synchronization information.

4. The method of claim 1,
wherein the lower-priority non-audio data includes the encrypted file and the higher-priority non-audio data from the extracted second set of packets includes the decryption key configured to decrypt the encrypted file.

5. The method of claim 1,
wherein the lower-priority non-audio data further includes an image file and the higher-priority non-audio data from the extracted second set of packets includes a thumbnail version of the image file, and
wherein the processing further includes presenting the thumbnail version of the image file while the image file is still being transferred on the non-QoS channel.

6. The method of claim 1, wherein the evaluating identifies the first and second sets of packets based upon packet markings within the first and/or second sets of packets.

7. The method of claim 1, wherein the higher-priority non-audio data from the extracted second set of packets corresponds to an independent file package with a size below a size threshold.

8. The method of claim 7, wherein an entirety of the independent file package is included within the extracted second set of packets.

9. A user equipment (UE) configured to engage in a communication session with one or more other UEs, comprising:
means for receiving a stream of packets from the one or more other UEs on a Quality of Service (QoS) channel on which audio traffic is primarily carried during the communication session, wherein the communication session is supported at the UE at least in part via the QoS channel and also via a non-QoS channel on which non-audio traffic is carried;
means for receiving a second stream of packets from the one or more other UEs on the non-QoS channel;
means for evaluating the stream of packets to identify (i) a first set of packets carrying audio data for the communication session and (ii) a second set of packets carrying higher-priority non-audio data for the communication session;
means for evaluating the second stream of packets to identify lower-priority non-audio data;
at least one processor configured to extract the first and second sets of packets from the stream of packets in response to the evaluation;
means for playing the audio data from the extracted first set of packets; and
means for processing the higher-priority non-audio data from the extracted second set of packets,
wherein the higher-priority non-audio data from the extracted second set of packets and the lower-priority non-audio data are associated with a video portion of the communication session, wherein the processing includes playing, in association with the playing of the audio data, the video portion based on the higher-priority non-audio data from the extracted second set of packets and the lower-priority non-audio data, wherein the higher-priority non-audio data from the extracted second set of packets includes, for the video portion of the communication session, one or more (i) I-slices or I-frames, (ii) header information including indications of macroblock (MB) type, quantization parameters and/or motion vectors, (iii) sequence parameter set (SPS) information, (iv) picture parameter set (PPS) information, (v) redundant slices or frames and/or (vi) lip synchronization information, or
wherein the lower-priority non-audio data includes an encrypted file and the higher-priority non-audio data from the extracted second set of packets includes a decryption key configured to decrypt the encrypted file, and wherein the processing includes decrypting the encrypted file using the decryption key.

10. A user equipment (UE) configured to engage in a communication session with one or more other UEs, comprising:
logic configured to receive a stream of packets from the one or more other UEs on a Quality of Service (QoS) channel on which audio traffic is primarily carried during the communication session, wherein the communication session is supported at the UE at least in part via the QoS channel and also via a non-QoS channel on which non-audio traffic is carried;
logic configured to receive a second stream of packets from the one or more other UEs on the non-QoS channel;
logic configured to evaluate the stream of packets to identify (i) a first set of packets carrying audio data for the communication session and (ii) a second set of packets carrying higher-priority non-audio data for the communication session;
logic configured to evaluate the second stream of packets to identify lower-priority non-audio data;
logic configured to extract the first and second sets of packets from the stream of packets in response to the evaluation;
logic configured to play the audio data from the extracted first set of packets; and
logic configured to process the higher-priority non-audio data from the extracted second set of packets,
wherein the higher-priority non-audio data from the extracted second set of packets and the lower-priority non-audio data are associated with a video portion of the communication session, wherein the processing includes playing, in association with the playing of the audio data, the video portion based on the higher-priority non-audio data from the extracted second set of packets and the lower-priority non-audio data, wherein the higher-priority non-audio data from the extracted second set of packets includes, for the video portion of the communication session, one or more (i) I-slices or I-frames, (ii) header information including indications of macroblock (MB) type, quantization parameters and/or motion vectors, (iii) sequence parameter set (SPS) information, (iv) picture parameter set (PPS) information, (v) redundant slices or frames and/or (vi) lip synchronization information, or
wherein the lower-priority non-audio data includes an encrypted file and the higher-priority non-audio data from the extracted second set of packets includes a decryption key configured to decrypt the encrypted file, and wherein the processing includes decrypting the encrypted file using the decryption key.

11. A non-transitory computer-readable medium containing instructions stored thereon, which, when executed by a processor of a user equipment (UE) configured to engage in a communication session with one or more other UEs, cause the processor of the UE to perform operations, the instructions comprising:
- at least one instruction for causing the processor of the UE to receive a stream of packets from the one or more other UEs on a Quality of Service (QoS) channel on which audio traffic is primarily carried during the communication session, wherein the communication session is supported at the UE at least in part via the QoS channel and also via a non-QoS channel on which non-audio traffic is carried;
- at least one instruction for causing the processor of the UE to receive a second stream of packets from the one or more other UEs on the non-QoS channel;
- at least one instruction for causing the processor of the UE to evaluate the stream of packets to identify (i) a first set of packets carrying audio data for the communication session and (ii) a second set of packets carrying higher-priority non-audio data for the communication session;
- at least one instruction for causing the processor of the UE to evaluate the second stream of packets to identify lower-priority non-audio data;
- at least one instruction for causing the processor of the UE to extract the first and second sets of packets from the stream of packets in response to the evaluation;
- at least one instruction for causing the processor of the UE to play the audio data from the extracted first set of packets; and
- at least one instruction for causing the processor of the UE to process the higher-priority non-audio data from the extracted second set of packets,
- wherein the higher-priority non-audio data from the extracted second set of packets and the lower-priority non-audio data are associated with a video portion of the communication session, wherein the processing includes playing, in association with the playing of the audio data, the video portion based on the higher-priority non-audio data from the extracted second set of packets and the lower-priority non-audio data, wherein the higher-priority non-audio data from the extracted second set of packets includes, for the video portion of the communication session, one or more (i) I-slices or I-frames, (ii) header information including indications of macroblock (MB) type, quantization parameters and/or motion vectors, (iii) sequence parameter set (SPS) information, (iv) picture parameter set (PPS) information, (v) redundant slices or frames and/or (vi) lip synchronization information, or
- wherein the lower-priority non-audio data includes an encrypted file and the higher-priority non-audio data from the extracted second set of packets includes a decryption key configured to decrypt the encrypted file, and wherein the processing includes decrypting the encrypted file using the decryption key.

* * * * *